May 22, 1934.   H. A. FOOTHORAP   1,959,783
COMBINED CALCULATING RECORDING MACHINE
Filed March 25, 1927   23 Sheets-Sheet 8

Inventor.
Harry A. Foothorap

Witness:
Philip E. Burns

By
L. G. Julihn
Attorney

May 22, 1934.    H. A. FOOTHORAP    1,959,783
COMBINED CALCULATING RECORDING MACHINE
Filed March 25, 1927    23 Sheets-Sheet 13
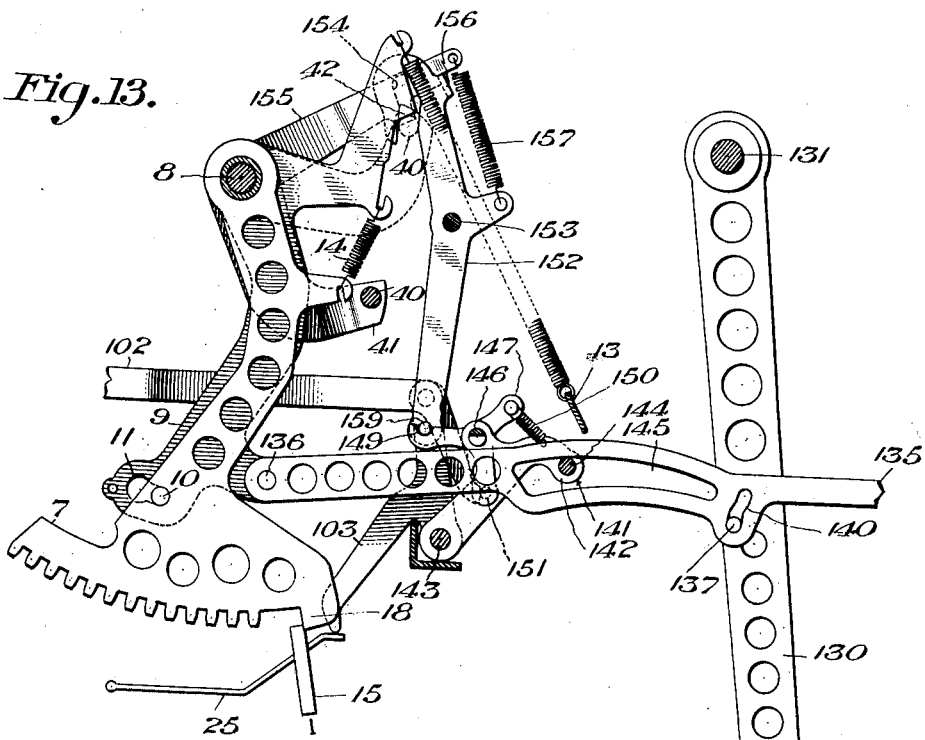
Fig.13.
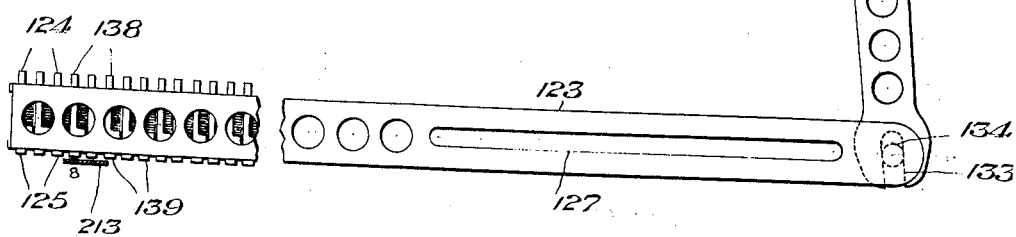
Witness:
Phinip P. Barnes
Inventor
Harry A. Foothorap
By L. G. Julihn
Attorney May 22, 1934.  H. A. FOOTHORAP  1,959,783
COMBINED CALCULATING RECORDING MACHINE
Filed March 25, 1927   23 Sheets-Sheet 14

Witness:
Philip E. Burns

Inventor
Harry A. Foothorap
By L. G. Julihn  Attorney

May 22, 1934.   H. A. FOOTHORAP   1,959,783
COMBINED CALCULATING RECORDING MACHINE
Filed March 25, 1927   23 Sheets-Sheet 15

Witness:

Inventor
Harry A. Foothorap
By
Attorney

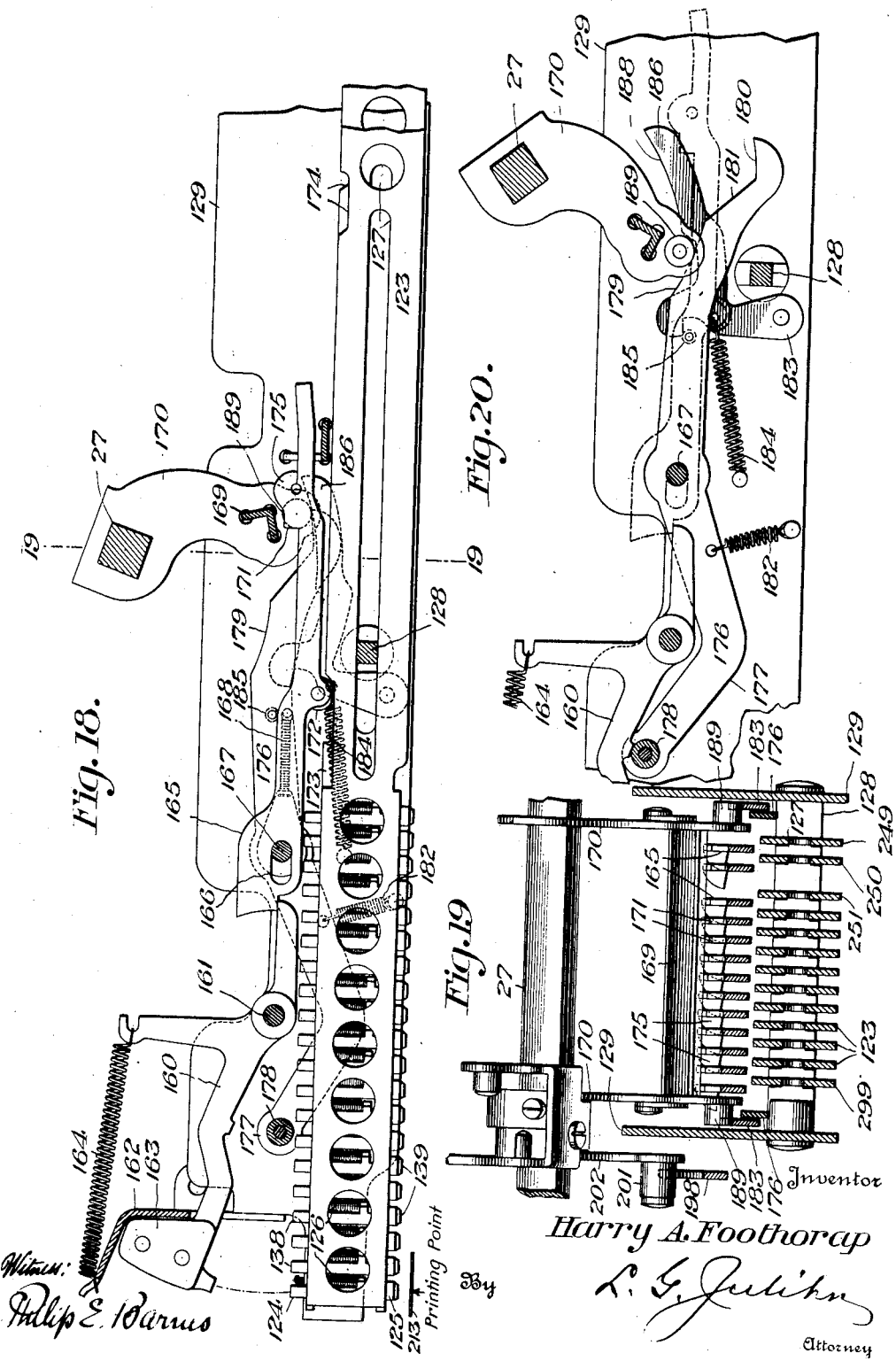

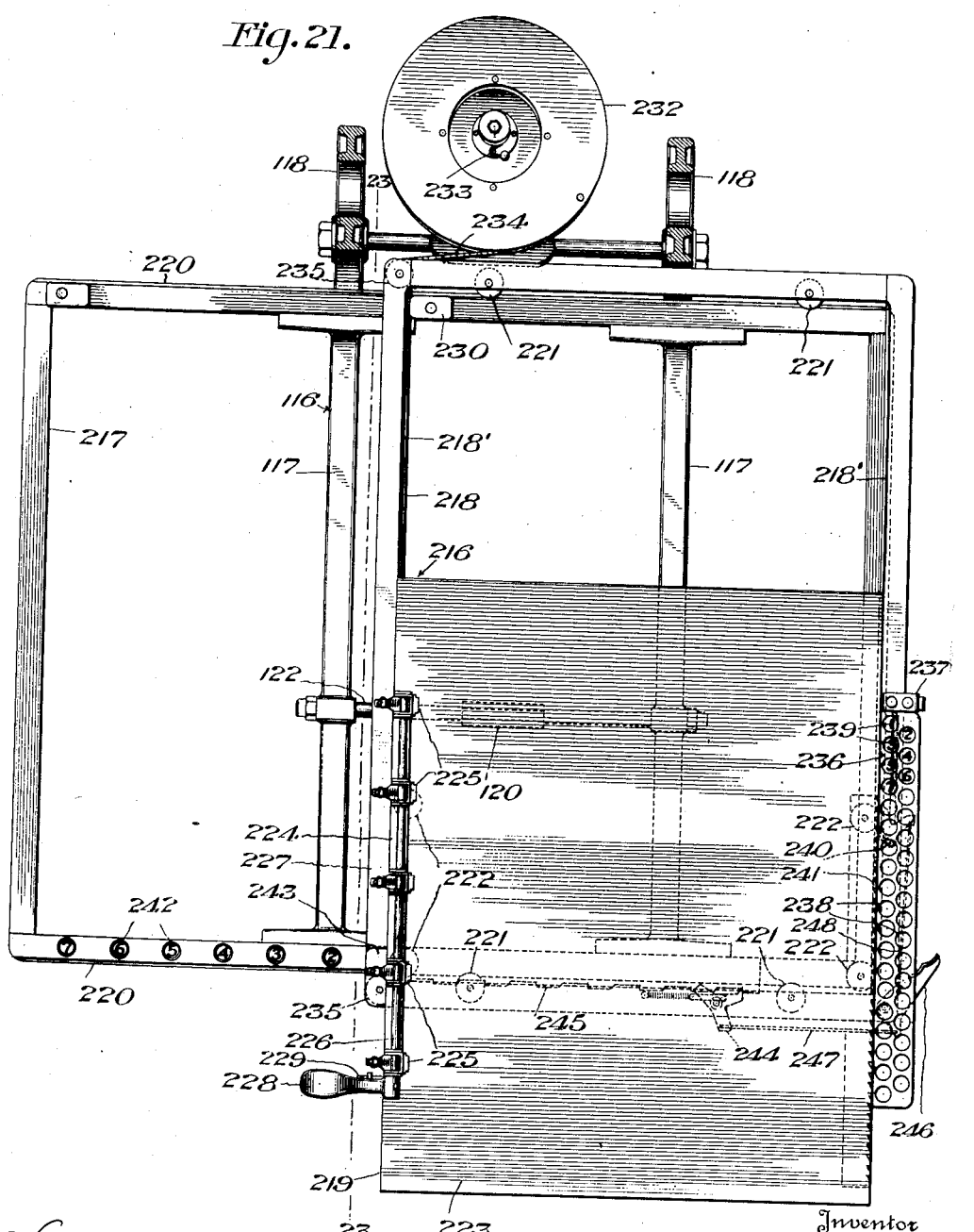

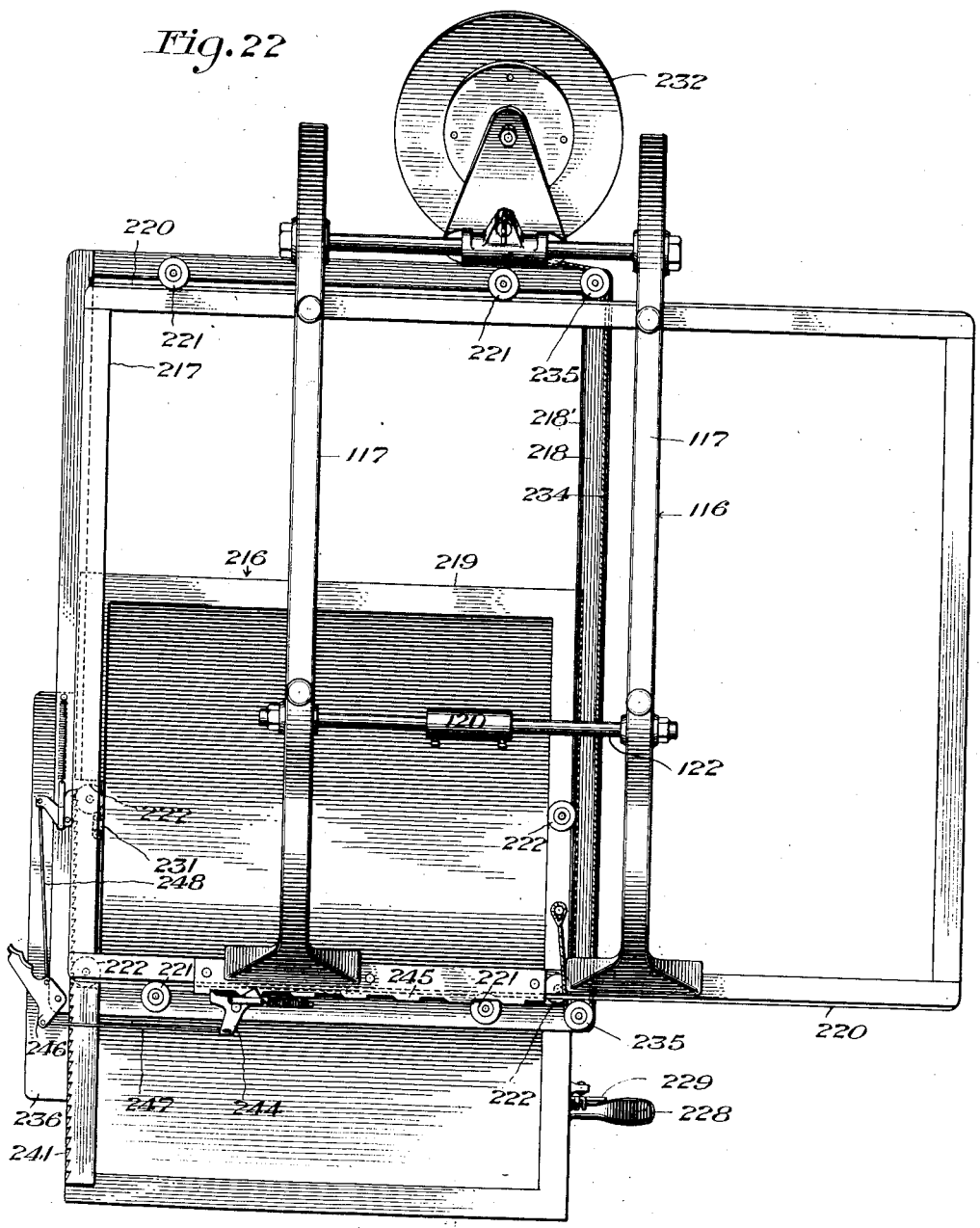

May 22, 1934.   H. A. FOOTHORAP   1,959,783
COMBINED CALCULATING RECORDING MACHINE
Filed March 25, 1927    23 Sheets-Sheet 19
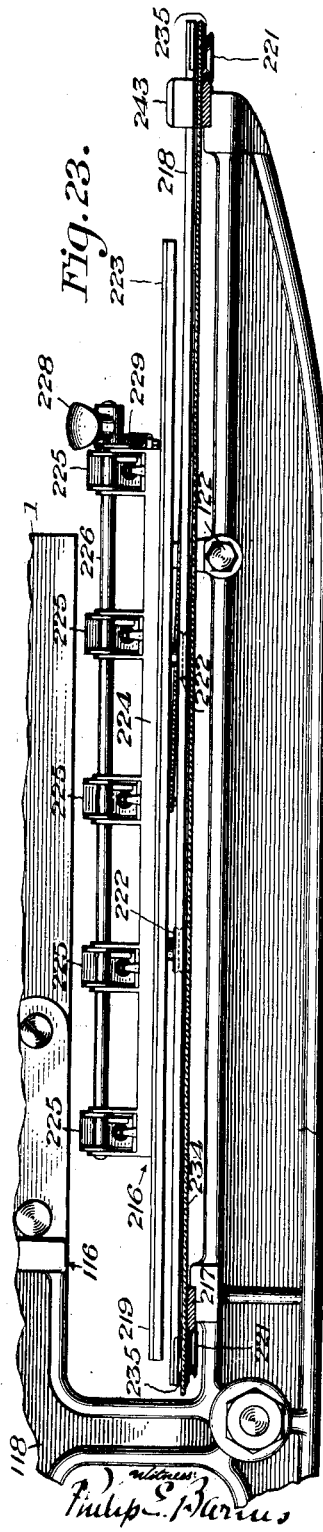
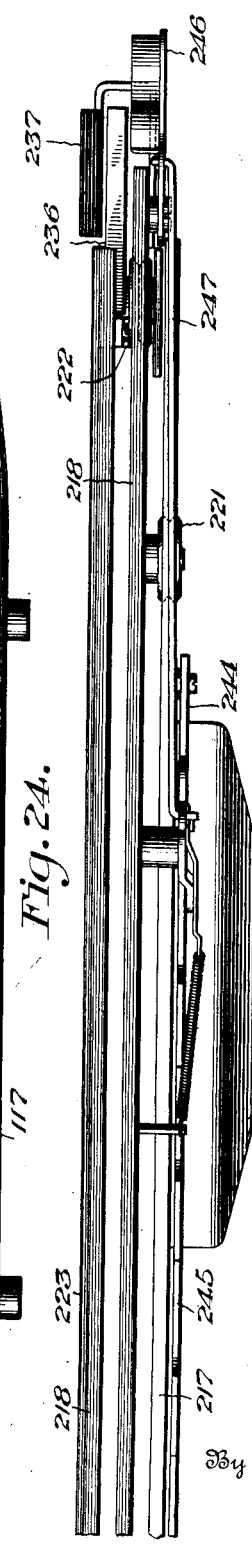
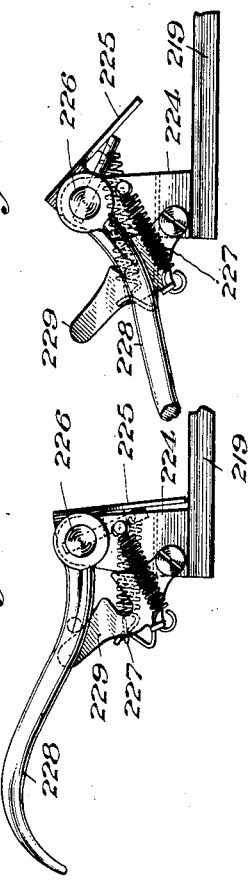
Inventor
Harry A. Foothorap
Attorney

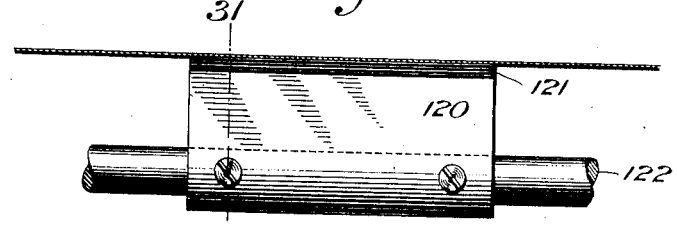
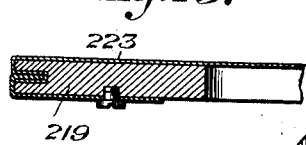
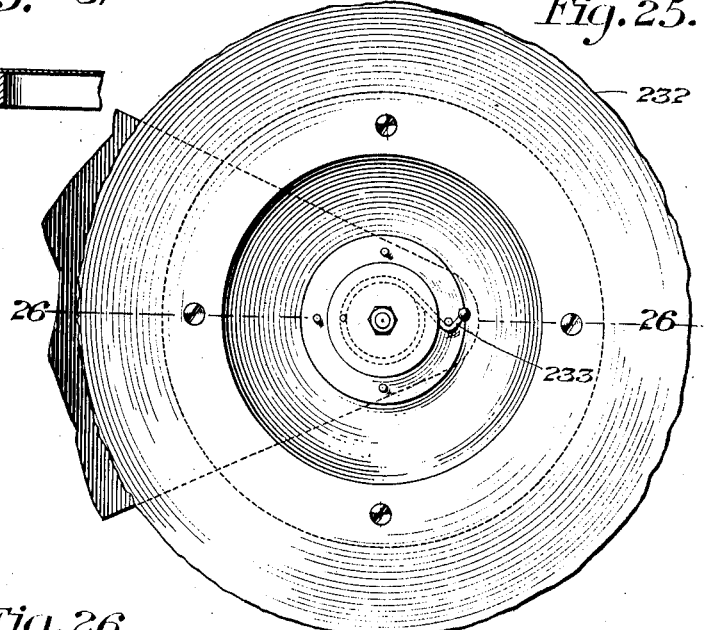
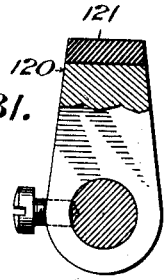
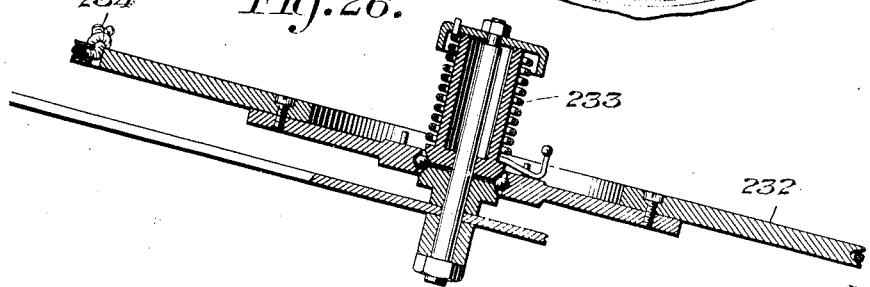

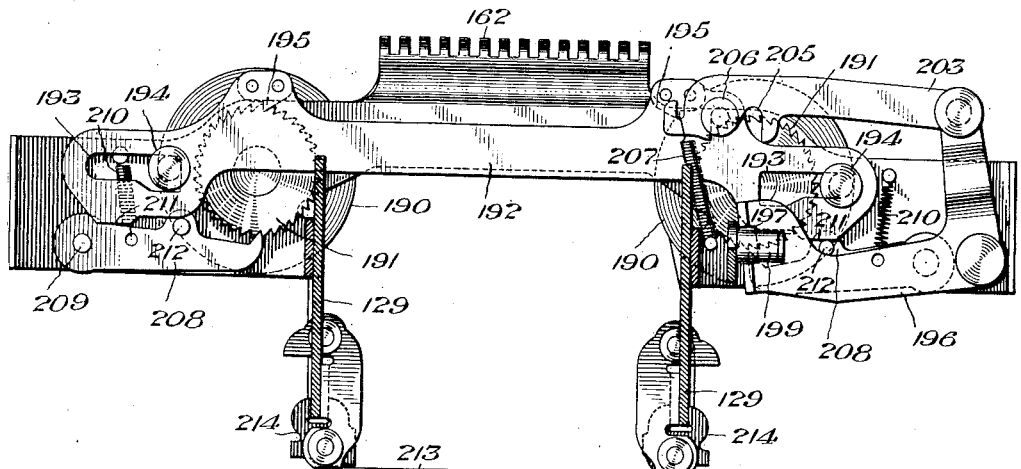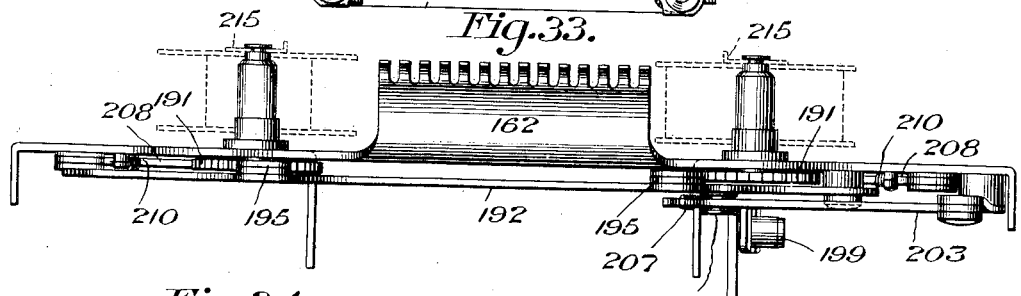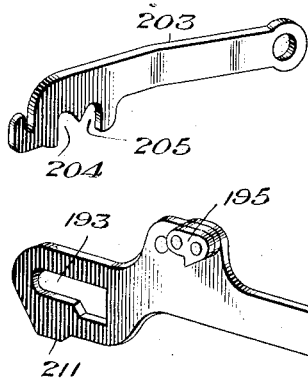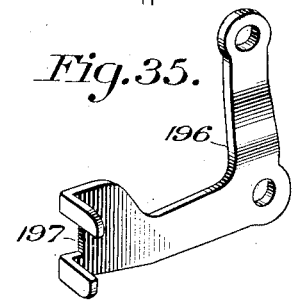

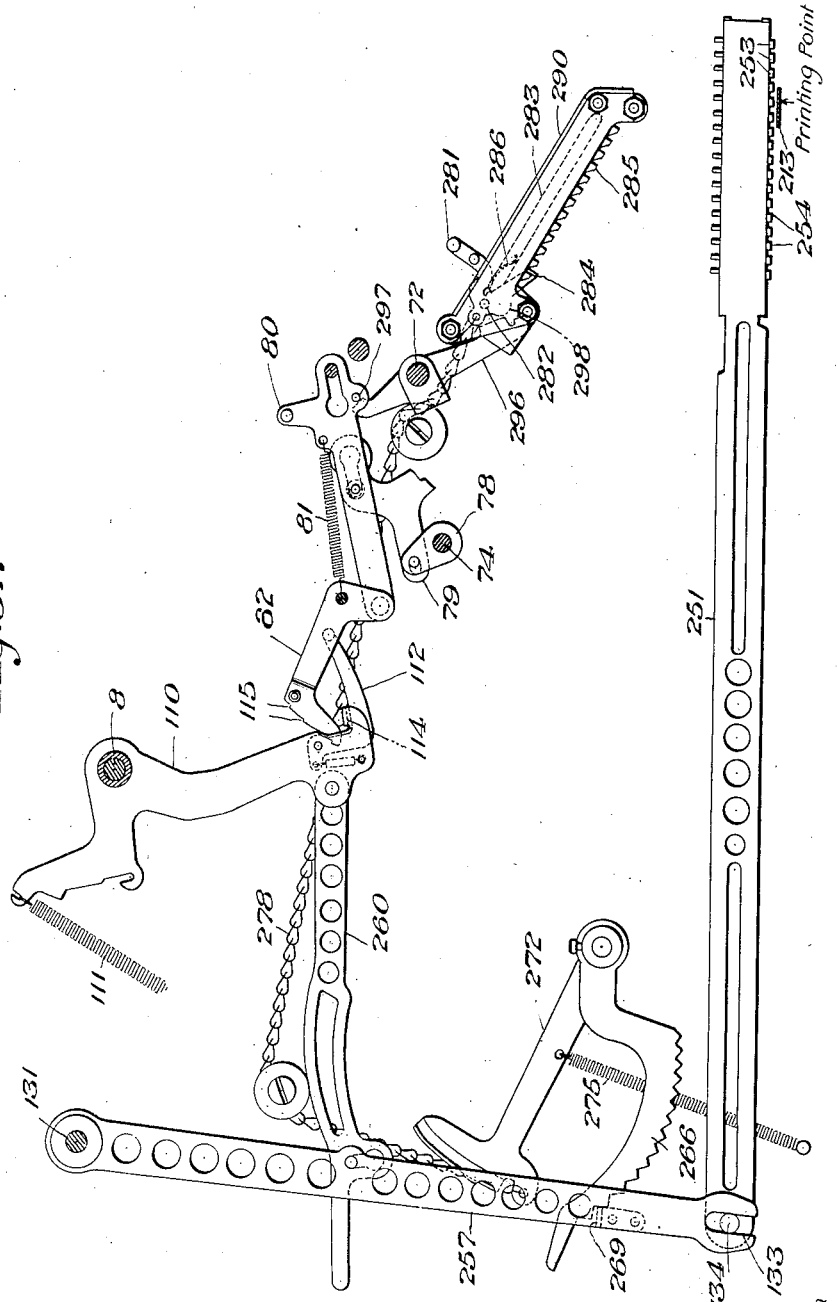

Patented May 22, 1934

1,959,783

UNITED STATES PATENT OFFICE 1,959,783

COMBINED CALCULATING RECORDING MACHINE

Harry A. Foothorap, Harrisburg, Pa., assignor, by mesne assignments, to Underwood Elliott Fisher Company, New York, N. Y., a corporation of Delaware Application March 25, 1927, Serial No. 178,348

39 Claims. (Cl. 235—60)

My invention relates to improvements in combined calculating recording machines.

Generally speaking, the object of my invention is to provide a calculating and recording machine which combines both key set and flat platen principles of operation and construction whereby the recognized advantages of both these types of machines are embodied in one.

Another object is to provide a key-set adding and subtracting machine equipped for recording upon a flat platen, and for indicating in distinguishing type whether a number has been added or subtracted.

Another object of my invention is the provision of a flat platen calculating and recording machine of the ten-key type combining a calculating mechanism, a main recording mechanism, and auxiliary recording units, all operated by a common operating mechanism, the calculating and main recording mechanism under the control of said keys, and the auxiliary recording units under individual separate controls.

Still another object of my invention is to provide a machine of the adding and listing type adapted for listing upon a flat platen and for listing the actual numbers subtracted when the complement of the number is introduced into the adding mechanism.

My invention further comprehends a novel work carrier universally movable relative to a flat platen for both line and column spacing and adapted to be automatically returned to starting position.

Various other objects are also contemplated by my invention as will presently appear when the nature of the invention is better understood.

To the accomplishment of the foregoing and said other objects there has been illustrated in the accompanying drawings a preferred form of the invention which will now be described in detail and defined in the appended claims.

Figure 10:
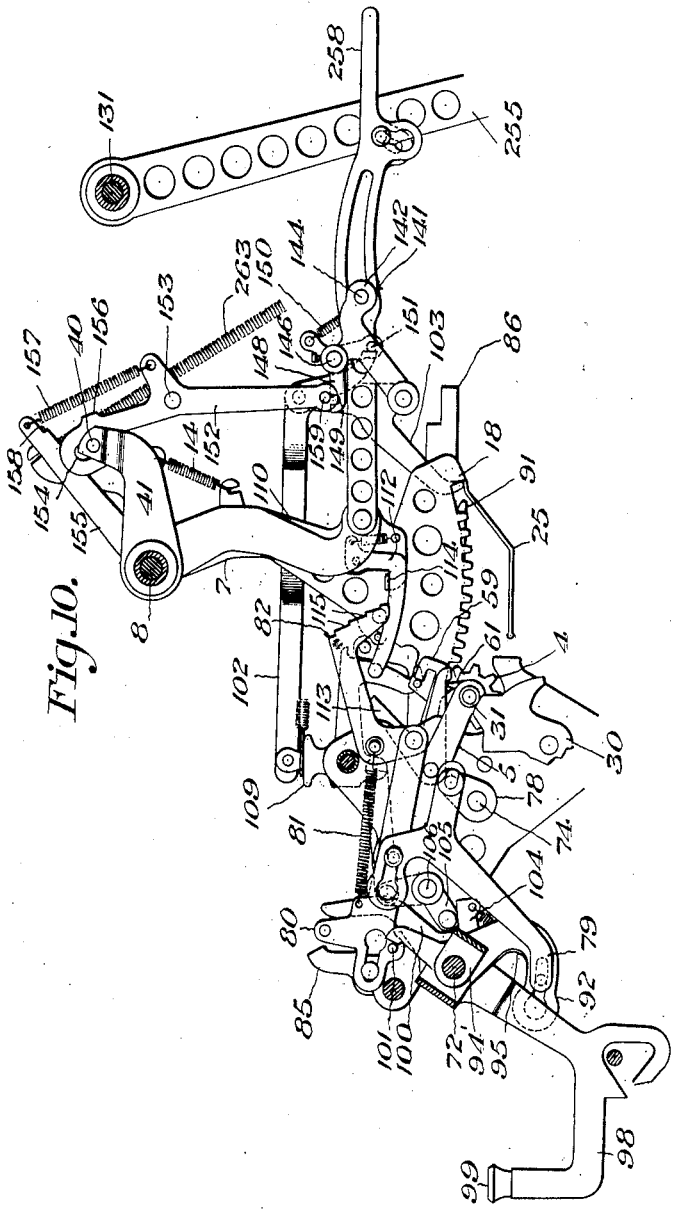

Figure 10 is another similar view looking toward the right of the machine, illustrating devices controlled by the special control keys of the calculating mechanism, together with parts of an auxiliary special character and date recording unit, included in the main recording mechanism, and controlled by said keys and devices, and means for adjusting the main recording mechanism to a subtract position under control of the subtract key.

Figure 11:
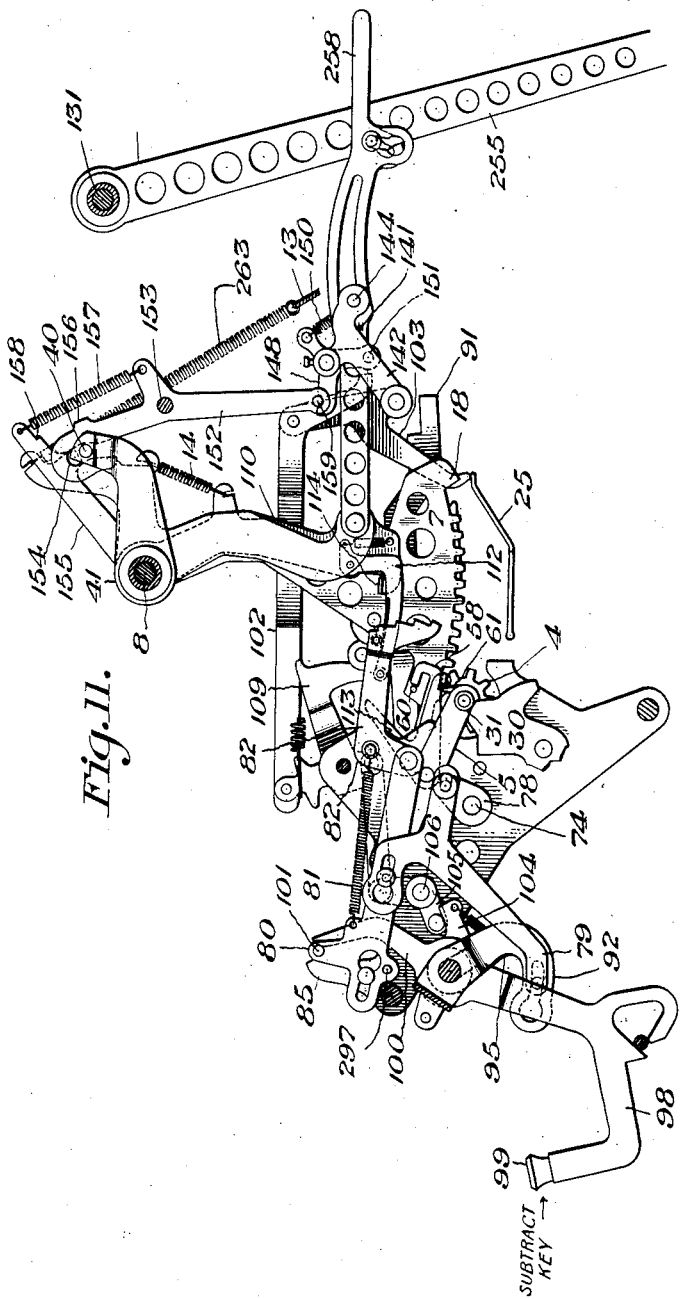

Figure 11 is a similar view showing the subtract key depressed and the resulting position of parts affected thereby.

Figure 12:
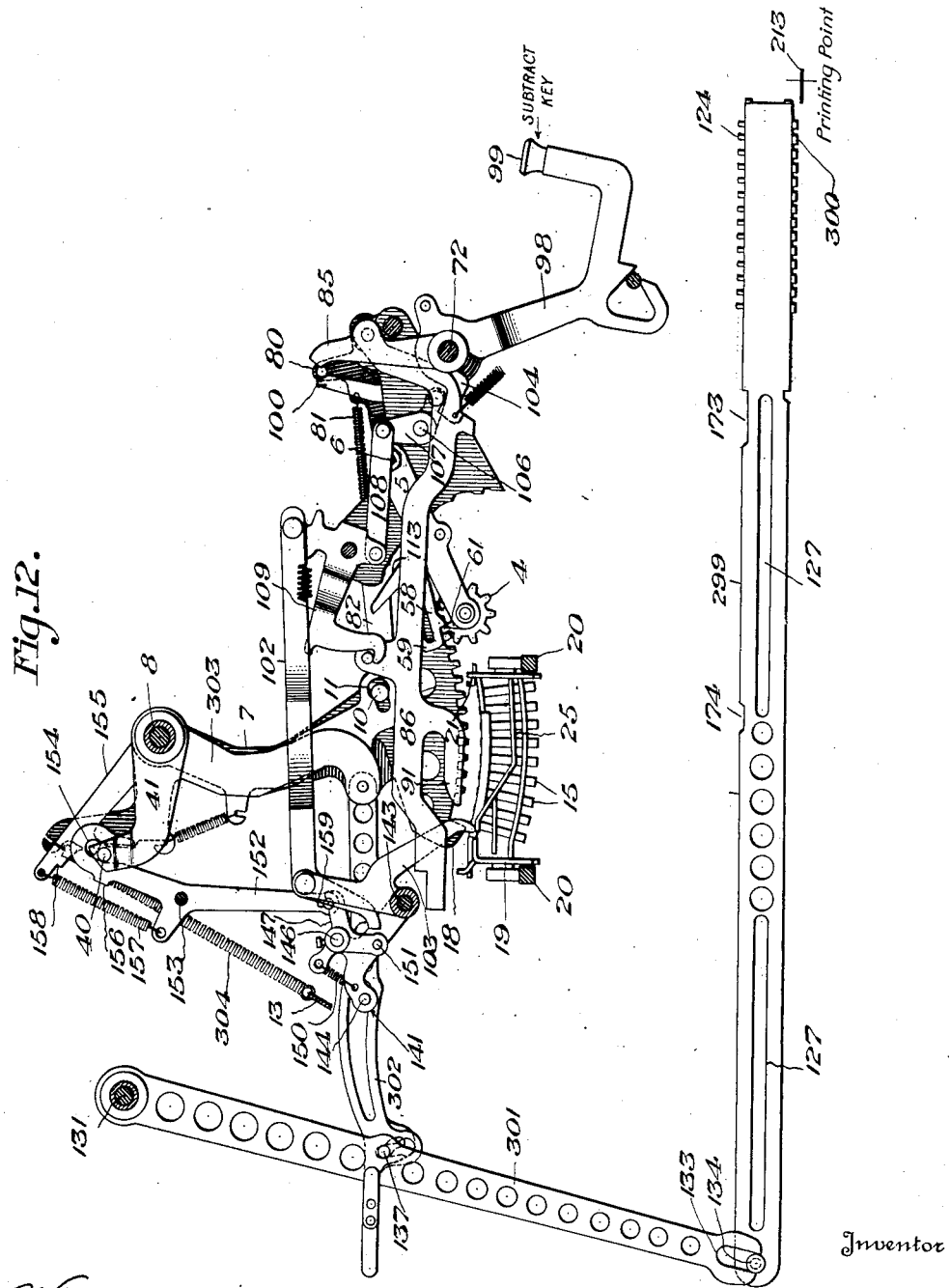

Figure 12 is another similar view, looking toward the opposite side of the machine.

Figure 8:
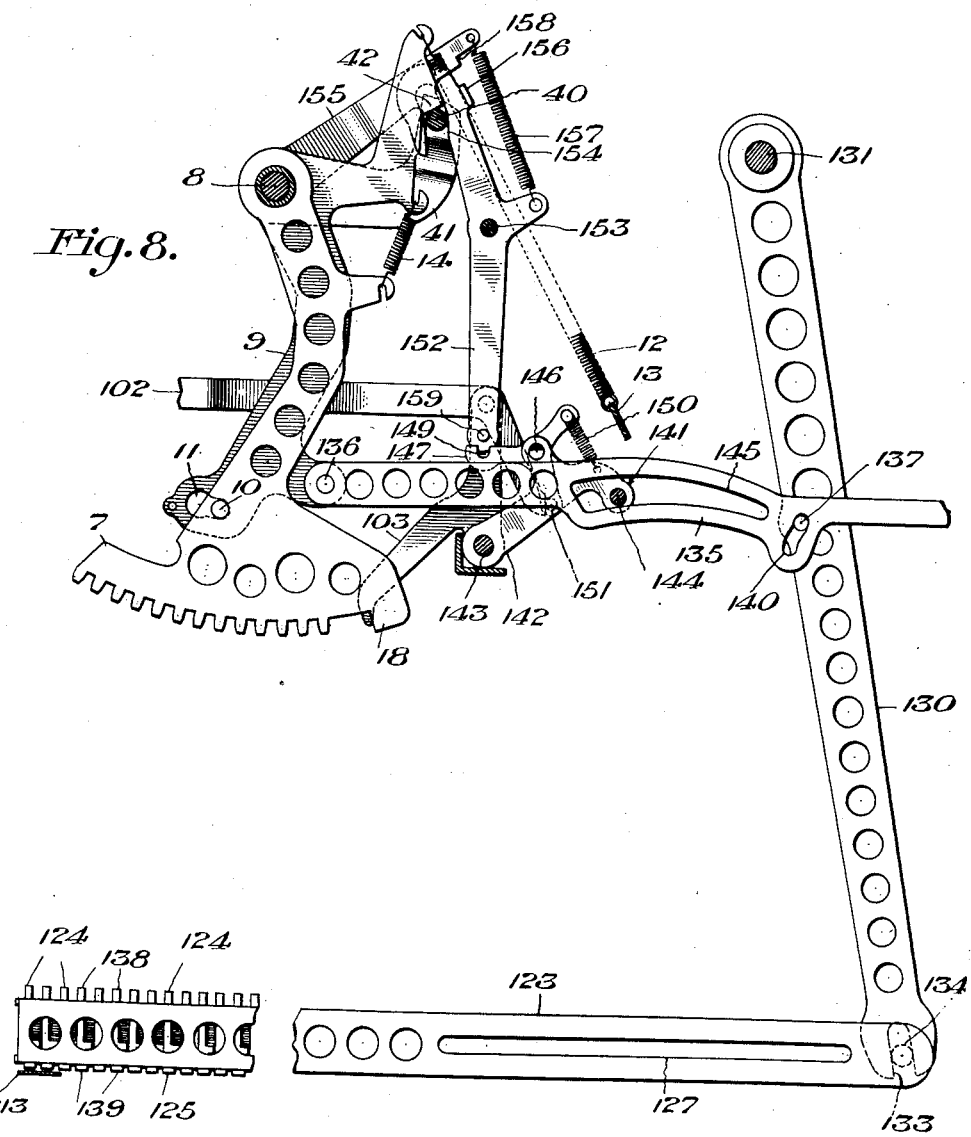
Figure 8 is a detail view partly in section and partly in elevation looking toward the left of the machine and illustrating the position of parts of the calculating and main recording mechanism during initial movement of the operating crank forwardly.

Figure 13 is a view similar to Figure 8, but illustrating the position of the parts at the end of a full forward stroke of the operating crank, the subtract key being held depressed, and the selector 1 being set up in the calculating mechanism.

Figure 14:
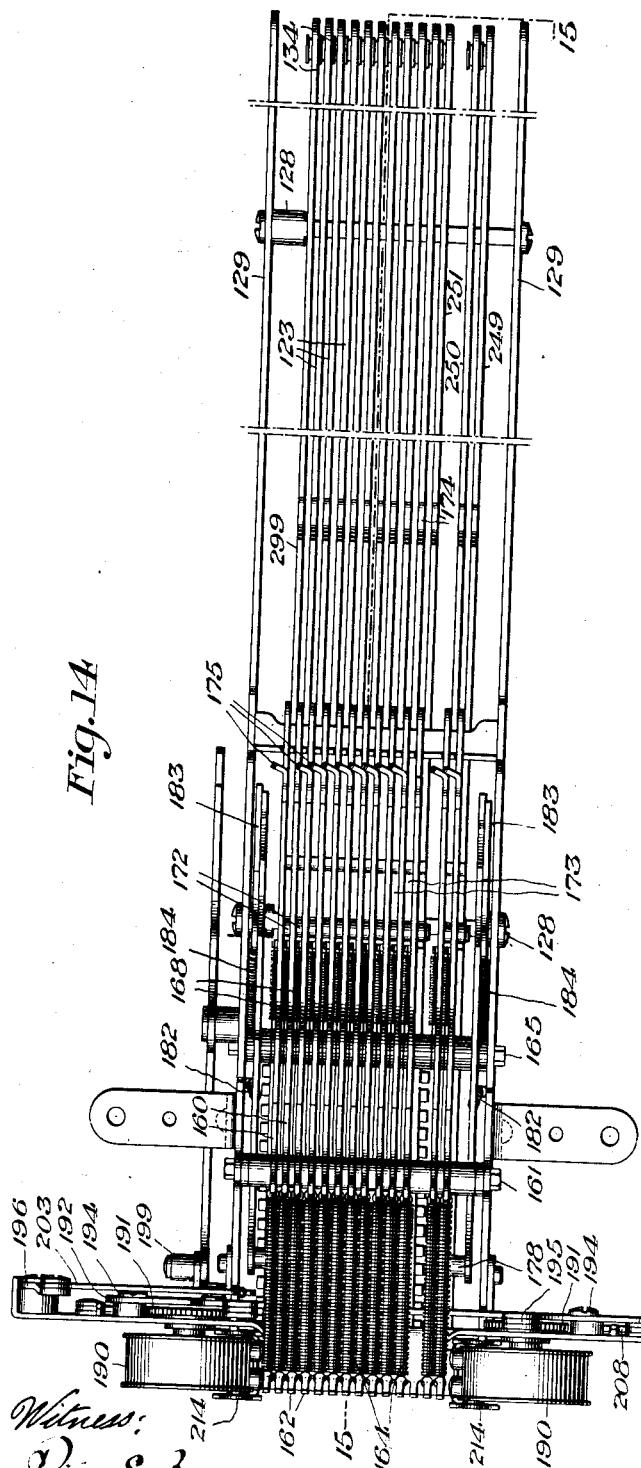

Figure 14 is a top plan view, partly broken out, of type carriers forming part of the main and auxiliary recording mechanisms of my invention, together with associated type hammers and devices controlling release and resetting of said hammers.

Figure 15:
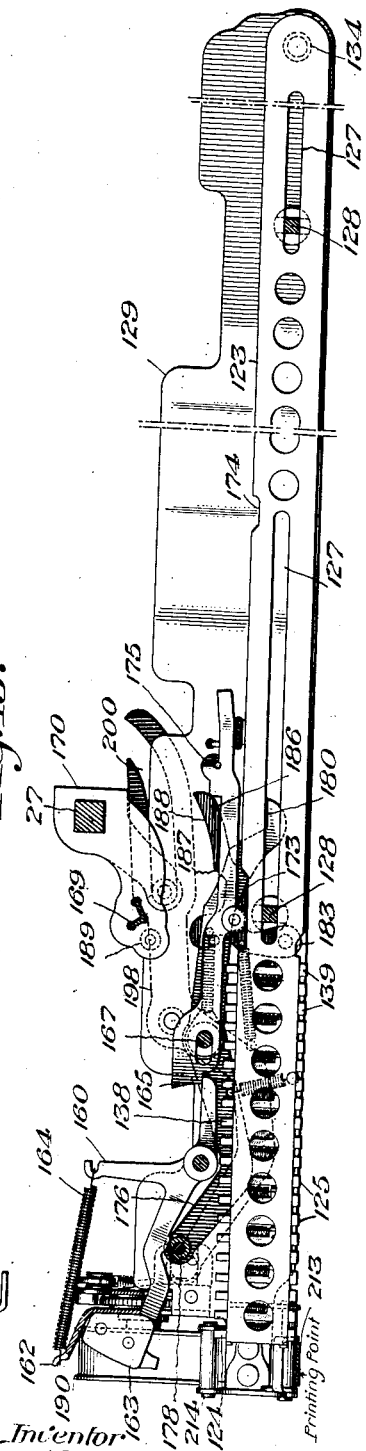

Figure 15 is a longitudinal sectional view taken on the line 15—15 of Figure 14.

Figure 16:
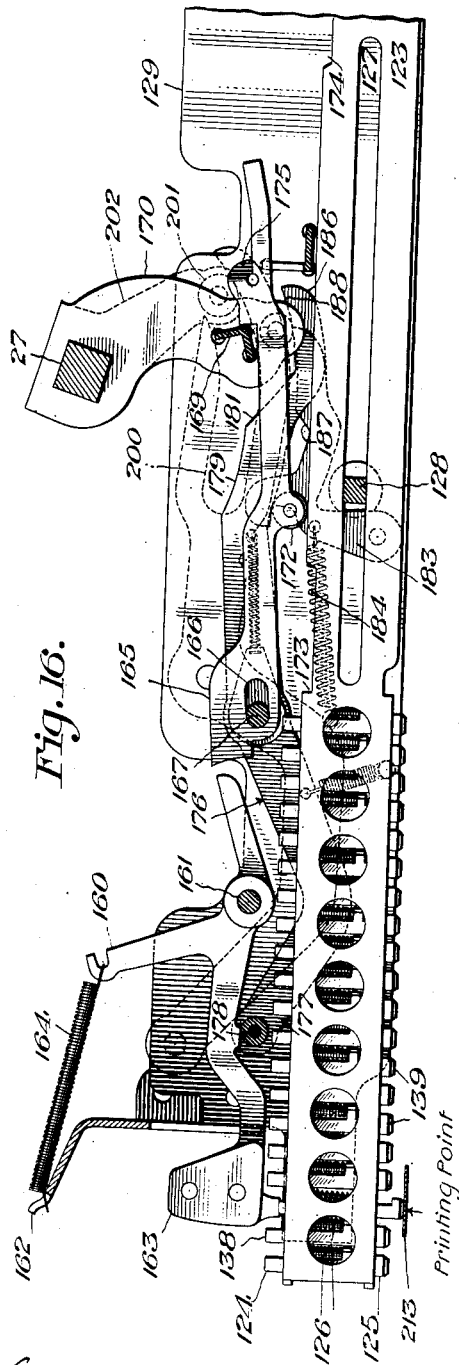

Figure 16 is an enlarged fragmentary view illustrating the operation of said hammers and associated releasing and resetting mechanisms.

Figure 17:
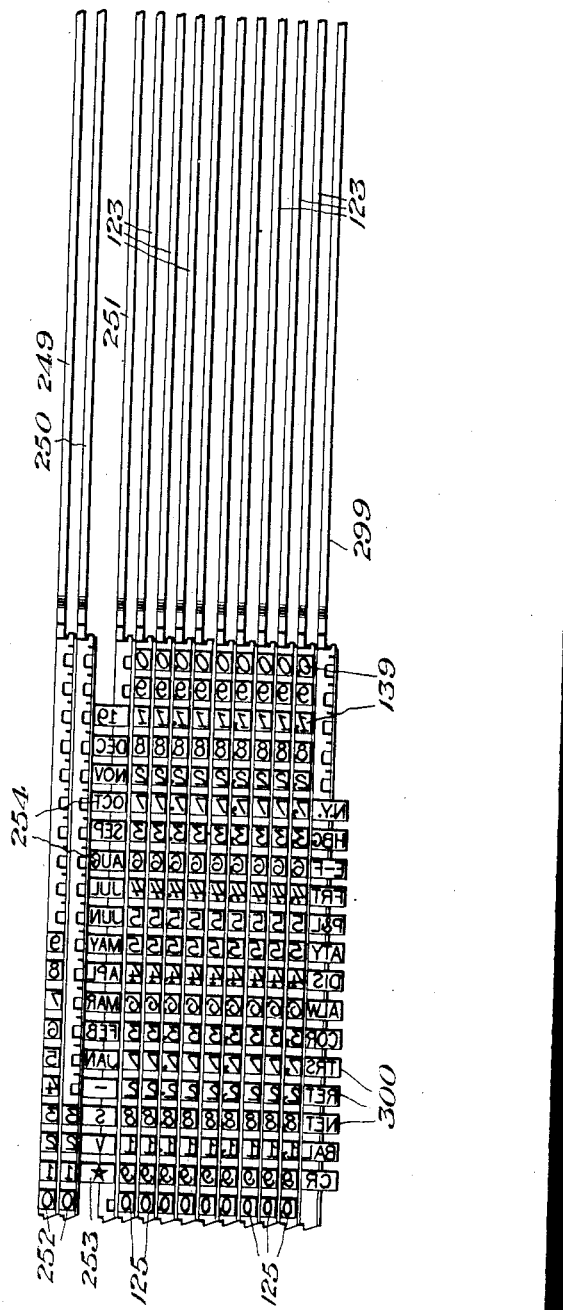

Figure 17 is a bottom plan view of type and type carriers included in the main recording and auxiliary mechanisms.

Figure 18 is a fragmentary view similar to Figure 16, illustrating the position of the type carriers, associated type hammers and their releasing and resetting mechanism, during initial forward movement of the operating crank.

Figure 19 is a transverse sectional view taken on the line 19—19 of Figure 18.

Figure 20 is a fragmentary view illustrating the operation of the hammer releasing and resetting mechanism.

Figure 21 is a top plan view of a work carrier mechanism associated with the recording mechanisms.

Figure 22 is a bottom plan view thereof.

Figure 23 is an enlarged sectional view taken on the line 23—23 of Figure 21.

Figure 24 is a fragmentary view in front elevation of the work carrier mechanism and associated parts.

Figure 25 is a top plan view of a motor driven drum for automatically returning the work carrier to starting position.

Figure 26 is a transverse sectional view taken on the line 26—26 of Figure 25.

Figure 27 is a detail view of edge clamps and a clamp latch with which the work carrier is provided.

Figure 28 is a similar view illustrating the operation of said clamps and latch.

Figure 29 is a fragmentary transverse sectional view of the work carrier, illustrating a structural detail thereof.

Figure 30 is a view in front elevation of a flat platen with which the work carrier is associated.

Figure 31 is a sectional view on the line 31—31 of Figure 30.

Figure 32 is a view in rear elevation of a ribbon mechanism for the recording mechanisms.

Figure 33 is a top plan view thereof.

Figure 34 is a perspective view of a ribbon reversing lever forming part of the ribbon mechanism.

Figure 35 is a similar view of an operating lever of the ribbon mechanism.

Figure 36 is a similar view of a ribbon feed bar.

Figure 37 is a view in elevation, illustrating a control mechanism for one of the auxiliary recording units.

Figure 38:
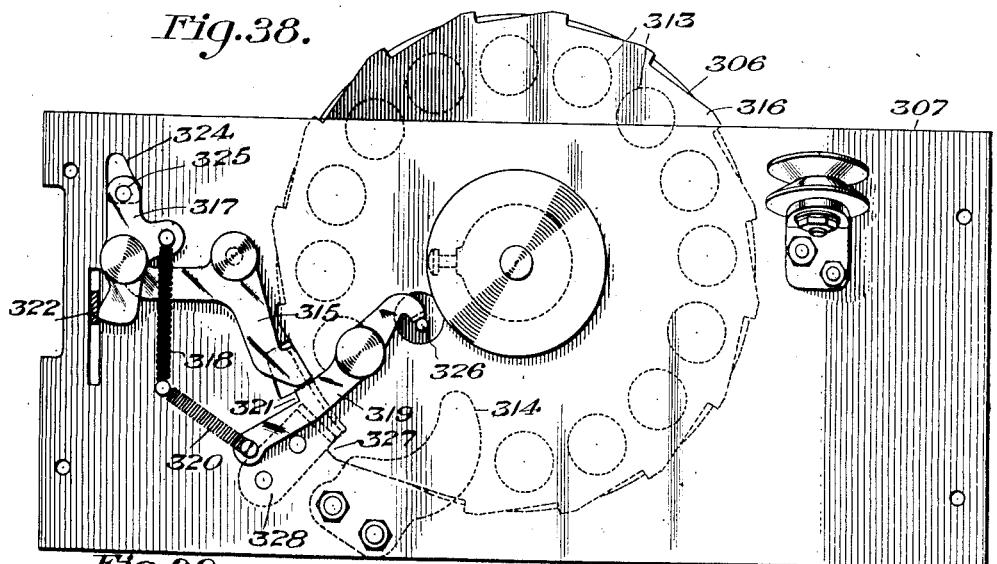

Figure 38 is a view in rear elevation of a control mechanism for another auxiliary recording unit.

Figure 39:
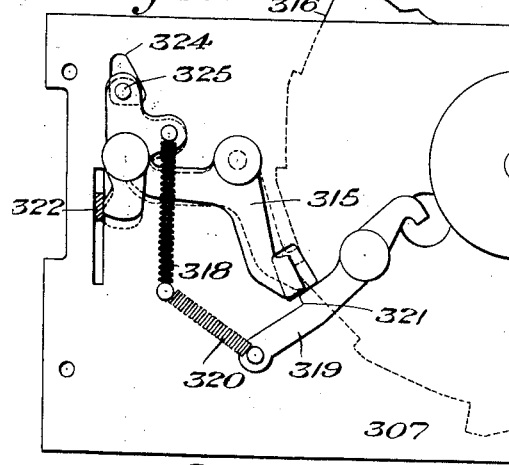

Figure 39 is a front elevation thereof.

Figure 40:
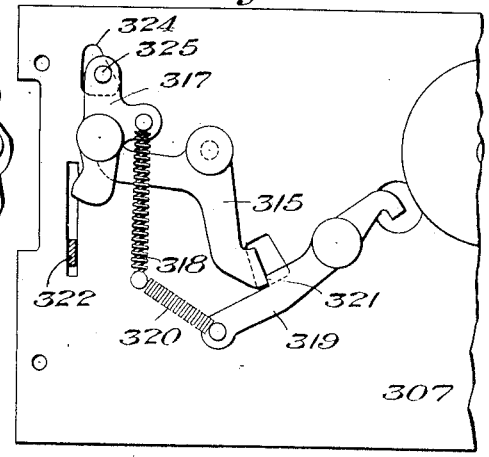

Figure 40 is a similar view illustrating parts in another position, and

Figure 41:
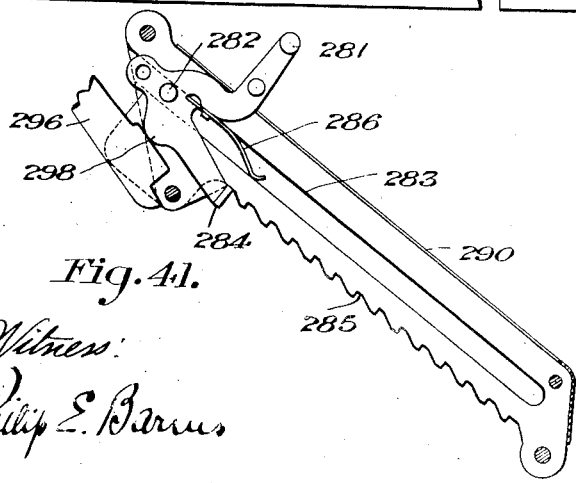

Figure 41 is a detail view of a key mounting for one of the auxiliary control mechanisms.

In said drawings, but by way of exemplification only, my invention has been shown as combining certain key-set principles of operation and construction of the well known Dalton adding and listing machine which will now be described as briefly as is consistent with a clear understanding of this invention.

Referring to the drawings, the numeral 1 designates the usual casing which encloses between its side walls 2 the operating parts of a Dalton machine.

Figure 9:
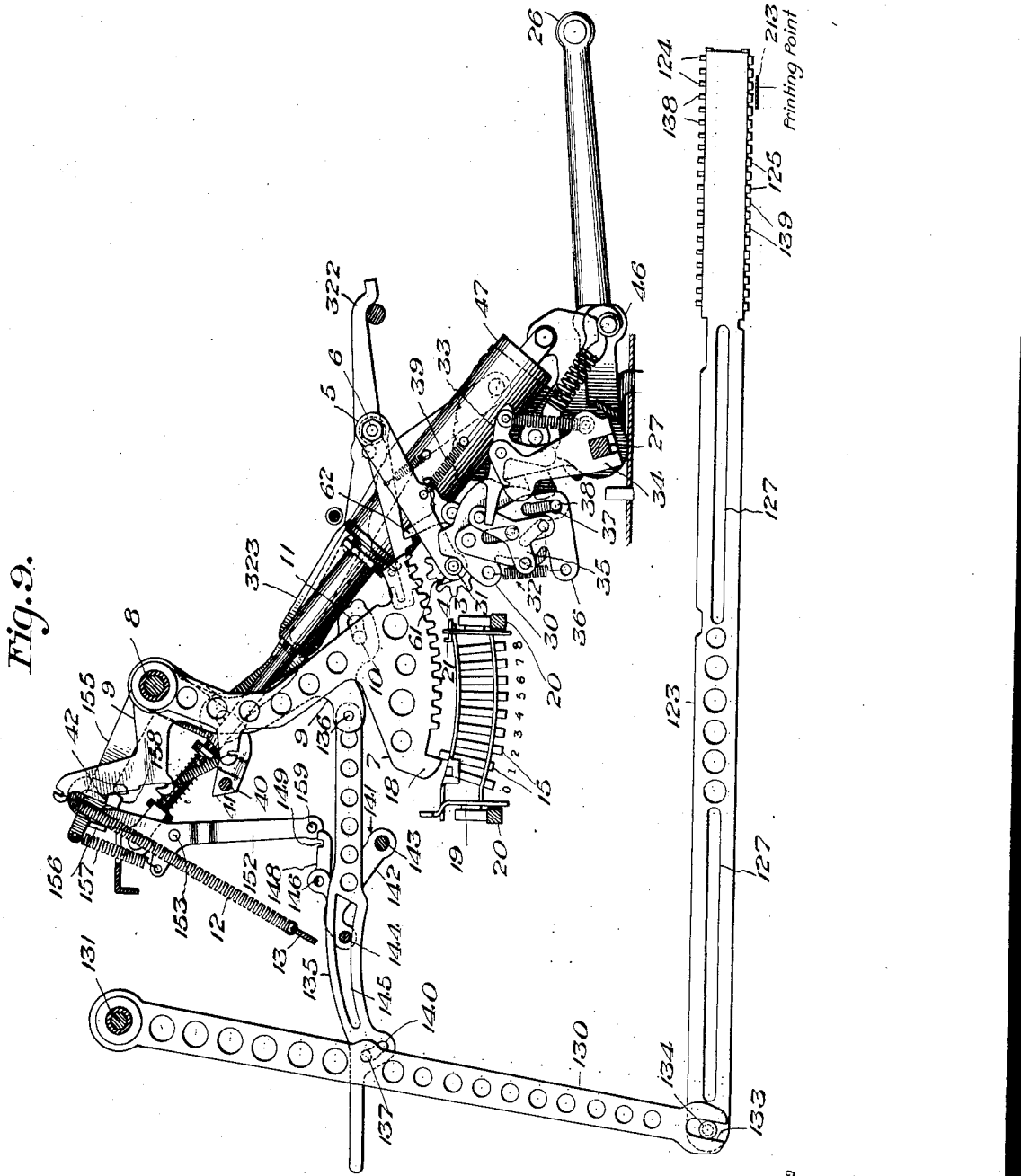
Figure 9 is a similar view looking in the opposite direction, illustrating the position of such parts and also other parts of the calculating mechanism at the end of a full forward stroke of the operating crank in a straight adding operation.

The register, designated generally by the numeral 3 (Fig. 2) includes the usual toothed number wheels, as at 4, arranged in progressively higher denominational order and rotated through ten degrees or increments of movement to accumulate values therein. The number wheels 4 are mounted between a pair of arms 5 (Figs. 3 and 9) pivoted, as at 6, for vertical movement and by means of which said wheels are engaged or disengaged with differential mechanism now to be described.

The differential mechanism includes toothed segmental actuators 7, one for each number wheel 4, loosely mounted upon a horizontal rock shaft 8 and oscillated back and forth over said number wheels 4 to drive the same. The actuators 7 are ordinarily driven through the medium of individual angular driving arms 9 loosely mounted intermediate their ends upon the rock shaft 8 and connected to their associated actuators 7 by pins 10 extended from the actuators and received by slots 11 in the arms. Individual motor springs 12, connected to the upper ends of the driving arms 9 and to a stationary cross bar 13 urge the lower ends of said arms 9 forwardly to impart forward movement to the actuators. Associated actuators 7 and driving arms 9 are connected by springs 14 (Fig. 2) urging the actuators 7 rearwardly and independently of their driving arms for effecting transfer operations as will presently appear.

The selections of values to be accumulated are, from "0" to "8" determined by means of a field of pins 15 (Fig. 9) disposed in rows and settable by the key levers 16 (Figs. 2 and 3) of the value keys 17 to intercept stop teeth 18 on the differential actuators 7 and limit their forward movement. As will be understood, the pins 15 by intercepting the advance of the actuators 7 predetermine the duration of their driving engagement with the number wheels 4 in accordance with the values of the keys depressed.

Figure 5:
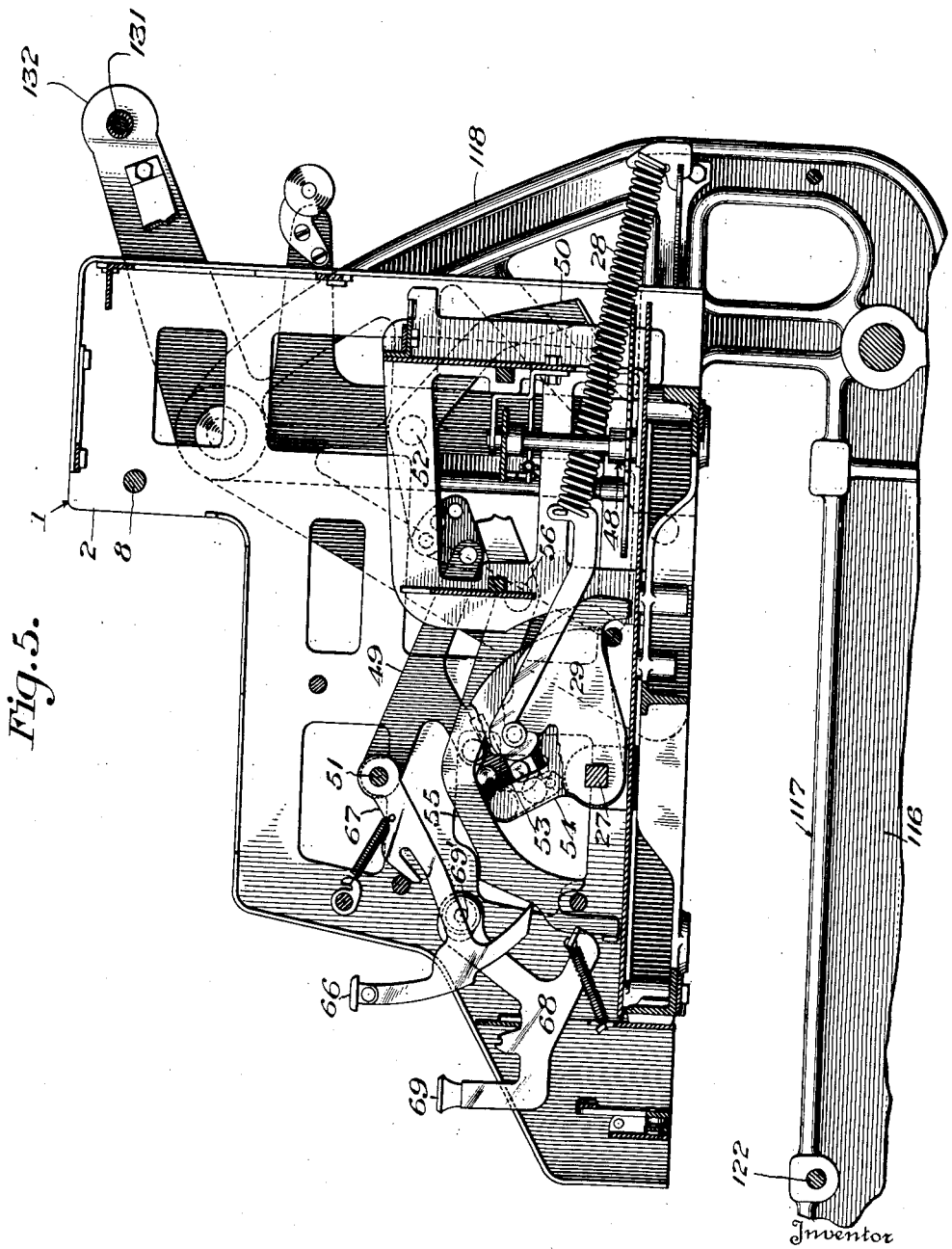
Figure 5 is still another similar view taken on an irregular line 5—5 of Figure 1, looking toward the left side of the machine.

The pins 15 (Fig. 9) are mounted in a denominational carriage 19 having an advance and return movement, upon tracks 20, across the differential actuators 7. Advance movement of the carriage 19 positions the field of pins 15 step by step, to associate a selected set up of pins with the differential actuators 7 to thus determine the denominational orders in which the value is to be accumulated in the register 3. At the same time the rows of pins 15 are successively presented in operative position relative to the key levers 16. Associated with the rows of pins 15 is a "nines" stop plate 21 mounted upon the carriage 19 and intercepting the stop teeth 18 to limit forward movement of the differential actuators 7 when accumulating the value of the "nine" key in the register. Denominational movement of the carriage 19 is effected by a motor spring 22 (Figs. 2 and 3) and controlled by an escapement 23, (Figs. 2 and 5) which is operated by the value key levers 16, and a universal bar 24, (Fig. 3) in a manner well understood in the art. In the starting position of the carriage 19, a tensioned stop plate 25 thereon blocks forward movement of all of the differential actuators 7. As the carriage advances denominationally, the plate 25 releases the differential actuators 7 successively to permit the motor springs 12 to swing them forwardly against the pins 15, or the "nines" stop plate 21, as the case may be. The plate 25 is depressible to release all the differential actuators 7 for a purpose presently explained.

The operating mechanism includes, in addition to the springs 12, an operating crank 26 (Fig. 9) fast upon an operating shaft 27 and operated through a forward and return cycle of movement. The crank 26 and shaft 27 are returned by springs, one of which is shown at 28 (Fig. 5) connected to a cam 29, fast on the operating shaft 27, and serving as one of its functions to limit return movement of said shaft. The operating shaft 27 at different periods in its cycle of operation, lowers or elevates the register 3, through the medium of a pair of cams 30 (Fig. 9), engaging beneath rollers 31 on the arms 5 and oscillated in unison under control of timing mechanism designated generally 32. The timing mechanism (see Figs. 3 and 9) includes a planetary tensioned tumbler 33 carried by a crank arm 34 fast upon the operating shaft 27. The tumbler is adapted to pick up a double crank 35 upon forward and return strokes of the operating crank 26 to rock it back and forth. The double crank 35 is independently rotatable about the axis of the cams 30 so that it may be set to change its position relative to the path of movement of the planetary tumbler 33. A tensioned slide 36 connects the double crank 35 with one cam 30 so that said crank 35, when rotated by the tumbler 33, also rotates the cam 30. The slide 36 has a cam slot and pin connection 37 and 38, respectively, with the double crank 35 so that it may be operated to set the double crank 35 to different positions.

Under normal conditions, the cams 30 hold the arms 5 elevated against the tension of springs 39, and the number wheels 4 meshed with the actuators 7. Upon the forward stroke of the operating crank 26, the tumbler 33 first picks up one arm of the double crank 35 and rotates the cams sufficiently to permit the tensioned arms 5 to descend and disengage the number wheels 4. Upon return movement of the operating crank 26, the tumbler 33 picks up the other arm of the double crank 35 and returns the cams 30 and arms 5 to elevate the number wheels 10 to engaging position.

Until the number wheels 4 and actuators 7 are disengaged, the driving arms 9 are held in starting position, by a rocking bail including a cross rod 40 (Figs. 2, 3 and 9) supported by arms 41 fast upon the rock shaft 8. The rod 40 normally engages beneath shoulders 42 formed upon the upper rear edges of the driving arms 9. The rock shaft 8 has a crank arm 43 fast thereon (see Fig. 4) connected by a link 44 to a sector 45 fast on the operating shaft 27. The structures designated by the numerals 46 and 47, respectively, are the usual safety devices in the form of a yielding connection between the operating shaft 27 and crank 43, and a dash pot for absorbing shock incident to the return of the operating shaft 27. As soon as the number wheels 4 and differential actuators 7 are disengaged, the rock shaft 8, as will be apparent, is rocked in one direction to remove the cross rod 40 from beneath the shoulders 42 (see Fig. 9) of the driving arms 9, whereupon the motor springs 12 of those driving arms 9 whose denominational actuators 7 are unobstructed by the stop plate 25, (Fig. 3) move such actuators 7 forwardly in accordance with the selection set up in the field of pins 15. Return movement of the operating crank 26 after meshing the number wheels 4 and differential actuators 7, returns the cross rod 40 to normal position, thus picking up the driving arms 9 of the forwardly moved differential actuators 7 and returning them to starting position to thereby rotate the number wheels 4 and accumulate the selection in the register.

The denominational carriage 19 is returned during the latter part of the return stroke of the operating crank 26 by carriage return mechanism designated generally by the numeral 48. (See Fig. 5.) The latter is operated by toggle levers 49 and 50 pivoted, respectively, at 51 and 52 to the casing 1. The toggle levers 49 and 50 are operated by the spring-pressed dog 53 pivoted upon a crank arm 54 fast upon the operating shaft 27. The arrangement is such that the dog 53, upon forward movement of the operating crank 27 springs into a position to move one of the toggle levers on return of said crank. The dog 53 is then disengaged by a cam lever 55 pivotally mounted as at 56. When the carriage 19 is returned, the set pins 15 wipe under a stationary plate 57 (Fig. 2) and are returned to unset position.

The transfer mechanism includes a series of pivoted transfer dogs, one of which is shown at 58, having respectively hooked free ends 59 engaging behind pins 60 on associated actuators 7. In the normal position of the calculating mechanism, the actuators 7 are held against rearward movement by the ends of the hooks 59, with their pins 11 midway of the slots 10 of the driving arms 9. The transfer dogs 58 are moved to a releasing position by transfer cams 61, one of which is associated with each number wheel. When thus released, the hooks 59 of said dogs are in position to receive the pins 60 therein and permit rearward movement of associated actuators 7, under the impulse of their springs 14, sufficient to add "1" to the proper number wheel 4. It will, of course, be understood that a transfer cam 61 of one wheel releases a transfer dog to initiate a transfer in a higher order number wheel. Resetting levers, one of which is shown at 62, are spring urged, as shown at 63, to latch the transfer dogs 58 in releasing position. The resetting levers 62 are unlatched at the beginning of the next forward stroke of the operating crank 26 by a cross rod 64 carried by the arms 5 and descending therewith. The driving arms 9 then immediately pick up those actuators 7, which have carried, and move them back to normal position. The pins 60 are thus moved from within the hooks 59 of the transfer dogs 58. Individual springs 65 then return the transfer dogs 58 to normal position upon the restoration of the cross rod 64 to its normal elevated position. It will be noted that because of the slot and pin connection 10 and 11 between the driving arms 9 and actuators 7, the driving arms 9, under non-transferring conditions, have an initial degree of idle forward movement before they pick up the actuators 7. This, as will be understood, is to allow for first disengaging the number wheels 4 from the actuators 7.

Referring to the special control keys of the Dalton machine, the correction key 66 (Figs. 2 and 5) has its lever 67 connected to the carriage return toggle levers 49, to move the latter independently of the operating crank 26 and operate the carriage return mechanism 48 to wipe out an incorrect selection of the pins 15 as will be clear.

The key lever 68 of the repeat or multiplying key 69, pivoted at 69', locks the pivoted cam lever 55 in position to hold the dog 53 out of operating position relative to the toggle levers 49, 50, so that the carriage return mechanism 48 is rendered inoperative, to enable an amount to be repeatedly accumulated in the register 3.

The key lever 70, (Fig. 3) of the non-add key 71, loosely mounted on a rock shaft 72, rotates bell crank 73 and rock shaft 74 in one direction through the link connection 75 and against the tension of spring 76. The bell crank 73 carries a pin 77 which is thus positioned in the path of movement of the planetary tumbler 33 to block its engagement with the double crank 35 during return of the operating crank 26. Hence the number wheels 4 remain disengaged from the differential actuators 7 during the return of the latter and no accumulation takes place in the register. Such movement of the bell crank 73 and rock shaft 74, moves crank 78 fast thereon (see Fig. 10) and pitman 79, to, in turn, advance a sliding link 80 against the tension of spring 81. This movement of the sliding link 80 by the non-add key lever 71 sets a pivoted segmental stop lever 82, (see also Fig. 11) from a normal position, in to what for the present may be explained as, a non-add position. The function of the segmental stop lever 82 will be described later on in connection with other devices with which it cooperates. The foregoing parts are returned to starting position by the springs 76 and 81.

The key lever 83, (Fig. 3) of the total key 84, which is fast upon the rock shaft 72, rocks said shaft and the crank arm 85, also fast on said shaft, and thereby imparts longitudinal movement to a locking bar 86 pivoted as at 87 to said crank 85. The locking bar 86, through slot and pin connections 88 and 89, respectively, rotates a bell crank 90, loose upon rock shaft 74, whereby one arm of the latter moves the tensioned slide 36, and positions the double crank 35 so that the tumbler 33 does not disengage the number wheels 4 and actuators 7 until the operating crank 26, and said actuators begin their return stroke. At the same time said locking bar 86, by means of arm 91 thereon, depresses the stop plate 25 on the carriage 19 into unobstructing position to release all the actuators 7. The number wheels 4, as will be understood, are reversible until they reach zero registering position in which position they are stopped by cooperation of the transfer cams 61 with the transfer dogs 58. Hence, the actuators 7 of those number wheels 4, out of zero registering position will, upon the forward stroke of the operating crank 26, move forward to rotate such wheels back to zero position and clear the register. In total taking operations, it will be seen, forward movement of the actuators 7 and driving arms 9 is limited in degree corresponding to the value in the register. The total key lever 83 (Figs. 3 and 4) operates sliding link 80 (Figs. 10 and 11) by means of the crank 92 fast upon the rock shaft 72 and connected to the pitman 79 to move the latter sufficiently to set the segmental stop lever 82 into another position.

The key lever 93 of the sub-total key 94, is loose upon the rock shaft 72 and adapted to pick up the total key lever 83 and also a sleeve 94 (Fig. 10) rotatable upon said shaft. In picking up the total key lever 83 (Fig. 3) the sub-total key lever 93 operates the locking bar 86, bell crank 73, tensioned slide 36, tumbler 33 and stop plate 25, as described with reference to the total taking operations, whereby the actuators 7, and number wheels 4 remain meshed during the forward stroke of the operating crank 26. In picking up the sleeve 94' (Fig. 10), the latter, through a crank arm 95 fast thereon, moves the pitman 79 to operate the sliding link 80 and thereby set the segmental stop lever 82 in still another position. The pitman 79 is moved by the subtotal key lever 93 in greater degree than by the total key lever whereby the crank 78 and rock shaft 74 are moved to rotate the bell crank 73 (Fig. 3) to the position described with reference to the non-add key lever 71. Hence, the actuators 7 and number wheels 4 also remain meshed during the return of the operating crank 26 and the number wheels 4 are not left in zero position as in taking a total. Forward movement of the differential actuators 7 and driving arms 9, it will be seen, is limited precisely as in total taking operations.

Figure 7:
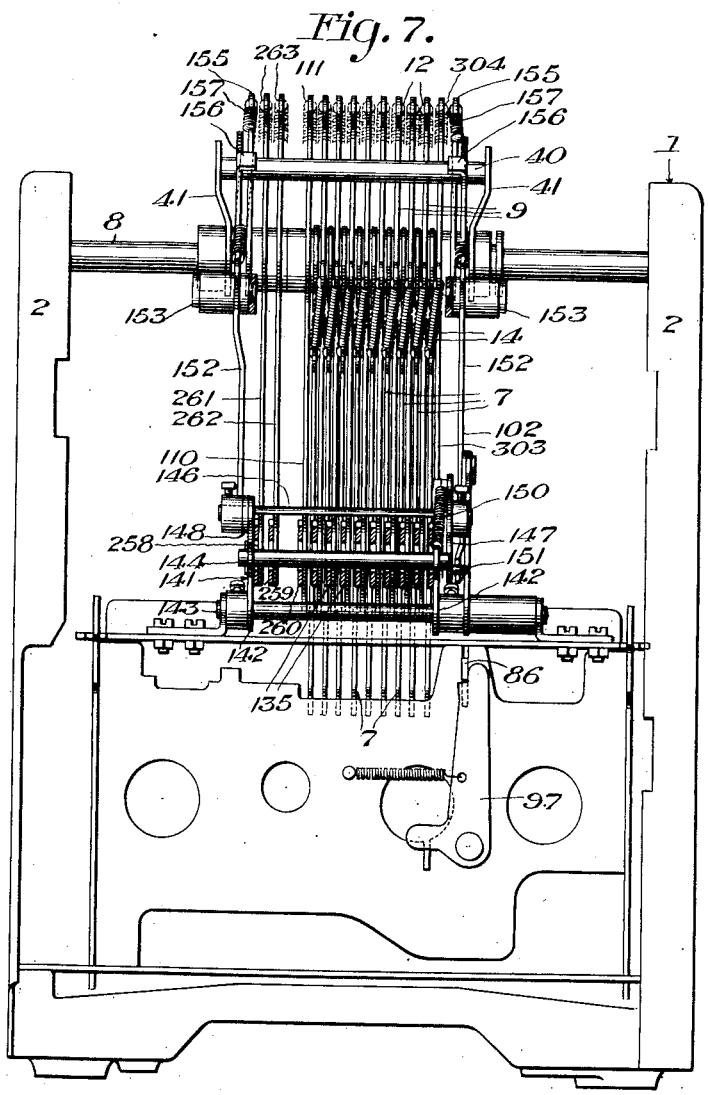
Figure 7 is another detail view, in rear elevation, with parts shown on a smaller scale.

The bar 86, it should be explained, comprises part of a locking mechanism, the primary function of which is to compel a blank stroke operation of the machine before taking a total or a sub-total. Such a blank stroke is required to return to normal position any transfer dogs 58 and actuators 57 which have assumed transferring position. It is believed that this feature of the machine need not be entered into further except perhaps to state that a cam bar 96 (Figs. 3 and 7) and a dog 97 are operated by said blank stroke to unlock the total and sub-total key levers 83 and 93.

The key lever 98, (Figs. 10 and 12) of the subtract key 99, which is loosely mounted upon the rock shaft 72, moves the sliding link 80, by means of a crank 100 and pin 101 to set the segmental stop lever 82 into a subtract position. At the same time, the subtract key lever 98 operates a spring-returned pull rod 102 (see Fig. 3) connected at its rear end to a pivoted rock arm 103 which depresses the stop plate 25 on the carriage 19 to actuator-releasing position. The pull rod 102 is operated through the medium of an arm 104 on the subtract key lever engaging a crank 105 on one end of rock shaft 106. The other end of the shaft 106 is connected to the pull rod by the crank 107, link 108 and rocking segment 109. (See Fig. 12.) The latter, in another of its functions, cooperates with the previously referred to locking bar 86 in a manner not important to the present disclosure. As will be understood, in subtracting in this machine, the complement of the subtrahend is set up in the carriage 19, and added in the register 3. Since, under subtracting conditions in the machine, all the differential actuators 7 are released by the stop plate 25, those to the left of the subtrahend move forward to the "nines" stop 25 and set up "nines" in their associated number wheels 4.

In subtracting, the additional or "fugitive 1" necessary to complete the true complement of a number, is automatically accumulated in the register 3 by a mechanism which releases a transfer dog 58 associated with the units actuator 7. This mechanism includes an arm 110, (Figs. 11 and 37) similar to driving arms 9, mounted upon the shaft 8. The arm 110 is operated in the same manner as driving arms 9 by the bail cross rod 40 and a motor spring 111. A finger 112 mounted upon the arm 110 is caused, during forward movement of said arm, to move a bell crank 113 which, in turn, releases the transfer dog 58 of said differential actuator 11. This actuator then executes a transfer operation upon the units number wheel to add 1 thereto as will be understood. A stop 114 on said arm 110 engages the segmental stop lever 82 in the normal position of the latter and limits forward movement of said arm 110 at the end of the initial idle degree of movement of the operating crank 25. In its different set positions, the segmental stop lever 82 presents different notches 115 in the path of the stop 114 to limit forward movement of the arm 110 in different degree.

Figure 1:
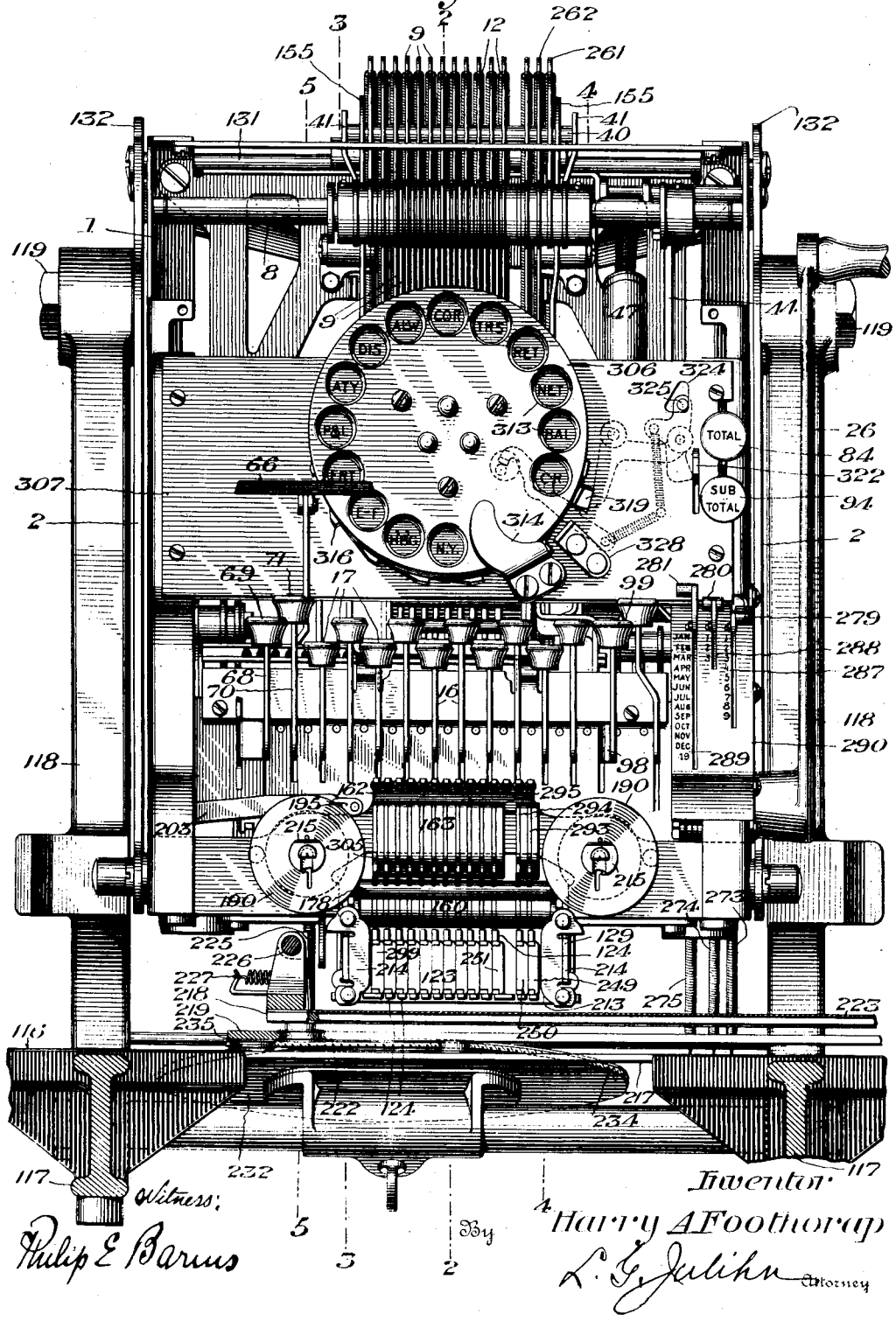
Figure 1 is a view in front elevation of a machine embodying my invention.

According to my invention a main recording mechanism is combined with the foregoing calculating mechanism, as follows. The calculating mechanism is mounted at the rear of a base 116, (Figs. 1 and 2) the latter including a pair of forwardly extending frame bars 117 having vertical brackets 118 at their rear ends between which the casing 1 is suspended, above said bars, as by trunnions 119.

A flat platen 120 (Figs. 2 and 30) having the form of a bar provided with a suitable resilient top covering 121 is mounted beneath the front of the calculating mechanism upon a tie rod 122 extending between the frame bars 117.

A series of horizontal type carriers 123, (Figs. 2, 4 and 14–19) one for each number wheel 4, are mounted between the calculating mechanism and the platen 120, side by side, to dispose them in a denominational order corresponding to that of the number wheels 4 and actuators 7. Mounted in the front ends of the type carriers 123 are a series of nine vertically disposed type bars 124 equidistantly spaced and provided at their lower ends with type 125, from "0" to "9," arranged in numerical order beginning at the front of said carriers. The type bars 124 normally project above the upper edges of the type carriers 123 for a purpose presently apparent and are held in such position by retractile springs 126, the spring acting against the lower edge of the carriers 123 as stops. The type carriers 123 are mounted for reciprocation back and forth to move them to and from recording position over the platen 120. For this purpose said carriers are preferably slotted at suitable intervals, as at 127, to receive and slide upon squared cross bars 128 extending between depending hanger plates 129 secured to the bottom of the casing 1.

A series of vertical type carrier levers 130, one for each type carrier, are mounted to swing back and forth upon a cross rod 131 secured in brackets 132 projecting from the rear of the casing 1 above the type carriers 123. The lower ends of the type carrier levers 130 are operatively connected with the rear ends of the type carriers 123 by a compensating slot 133 receiving a roller 134 on the carrier.

The type carriers 123 are connected to the driving arms 9 of actuators 7 of corresponding denominational order by individual horizontal links 135 whereby said carriers are moved to and from recording position by said driving arms, but under control of said actuators. The links 135 are pivotally connected at one end to the lower ends of the driving arms 9 by pins 136 (Figs. 8 and 9) and have their opposite ends similarly connected to the type carrier levers by pins 137. As will be seen, the type carriers 123 are movable by the driving arms 9 through an operating cycle, first, forwardly through the aforesaid idle degree of movement of said arms 9, then in degree predetermined by the selection set up in the machine, and then backwardly to starting position.

At this point it is to be noted that the idle degree of forward movement of the driving arms 9 brings them into operative engagement with the actuators 7, while the latter are in a zero selecting position. The spacing of the type bars 124 and the arrangement of the link connections 135 between the driving arms 9 and type carrier levers 130 is such that during straight adding or blank stroke operations, the zeros of the type 125 will be moved to recording position during this idle degree of forward movement of the arms 9 as shown in Figure 8. Thereafter, further forward movement of said arms 9 will move type 125 to recording positions corresponding in value to the number of increments of forward movement of the actuators 7. This is clearly illustrated in Figures 9 and 16, wherein the "1" type has been moved to recording position in accordance with a selection of "1" set up in the calculating mechanism.

A second series of vertical type bars 138 provided with type 139 at their lower ends are mounted upon each type carrier 123 for recording during subtracting operations. The type bars 138 and their type 139 alternate with the bars 124 and type 125, and said type 139 are disposed in reverse numerical order beginning with "9" adjacent the front of the carriers 123 and ending with "0", as shown in Figure 17. The type bars 138 are mounted upon their carriers and relatively spaced as described with reference to type bars 124. Preferably the type 139 are italics to distinguish them from type 125. As will be understood, the series of type 139 are normally idle and must be operatively positioned for movement to and from recording position.

Figure 3:
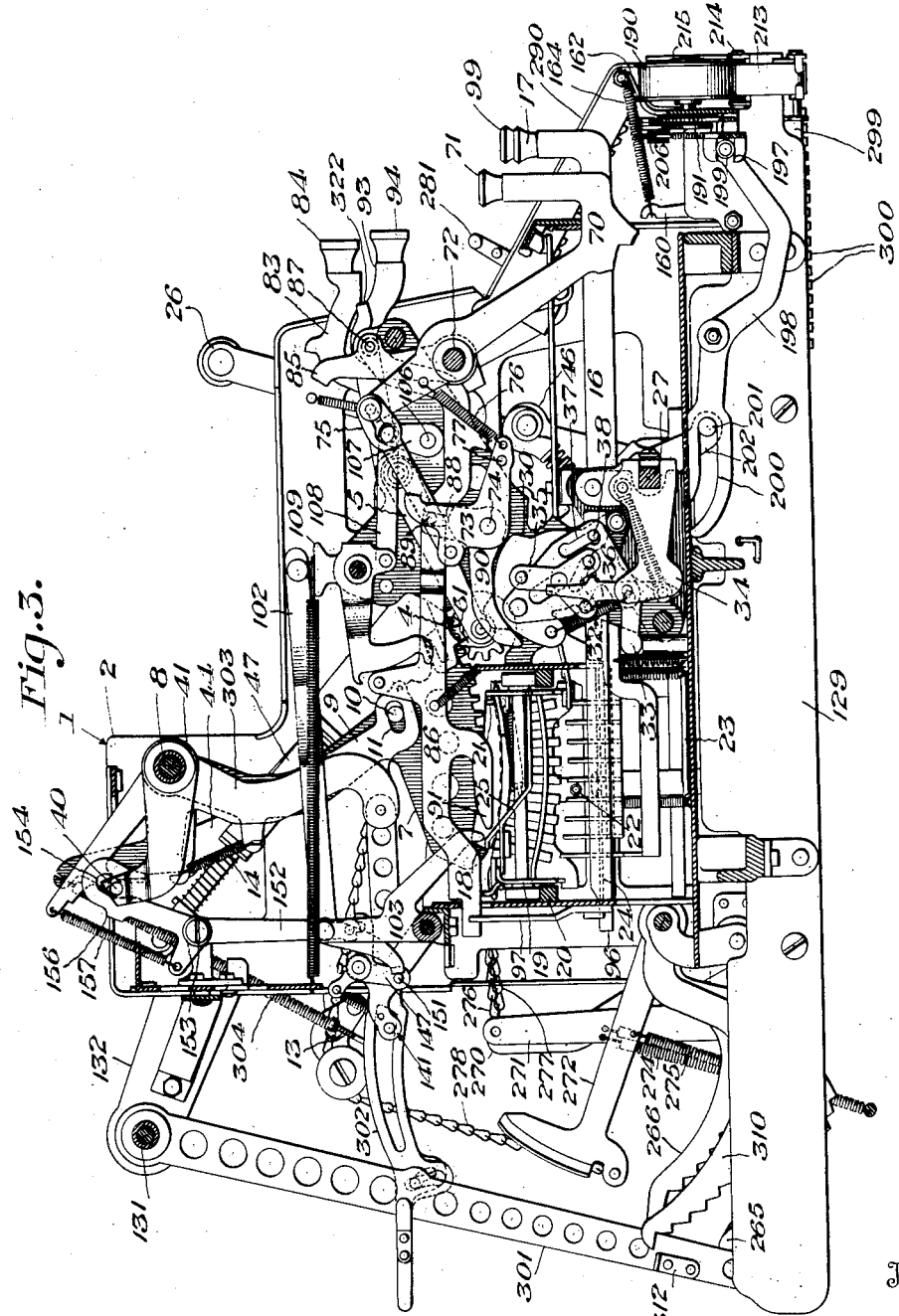
Figure 3 is a similar view, taken on the line 3—3 of Figure 1, but looking in the opposite direction, and with parts omitted for the sake of clearness.
Figure 4:
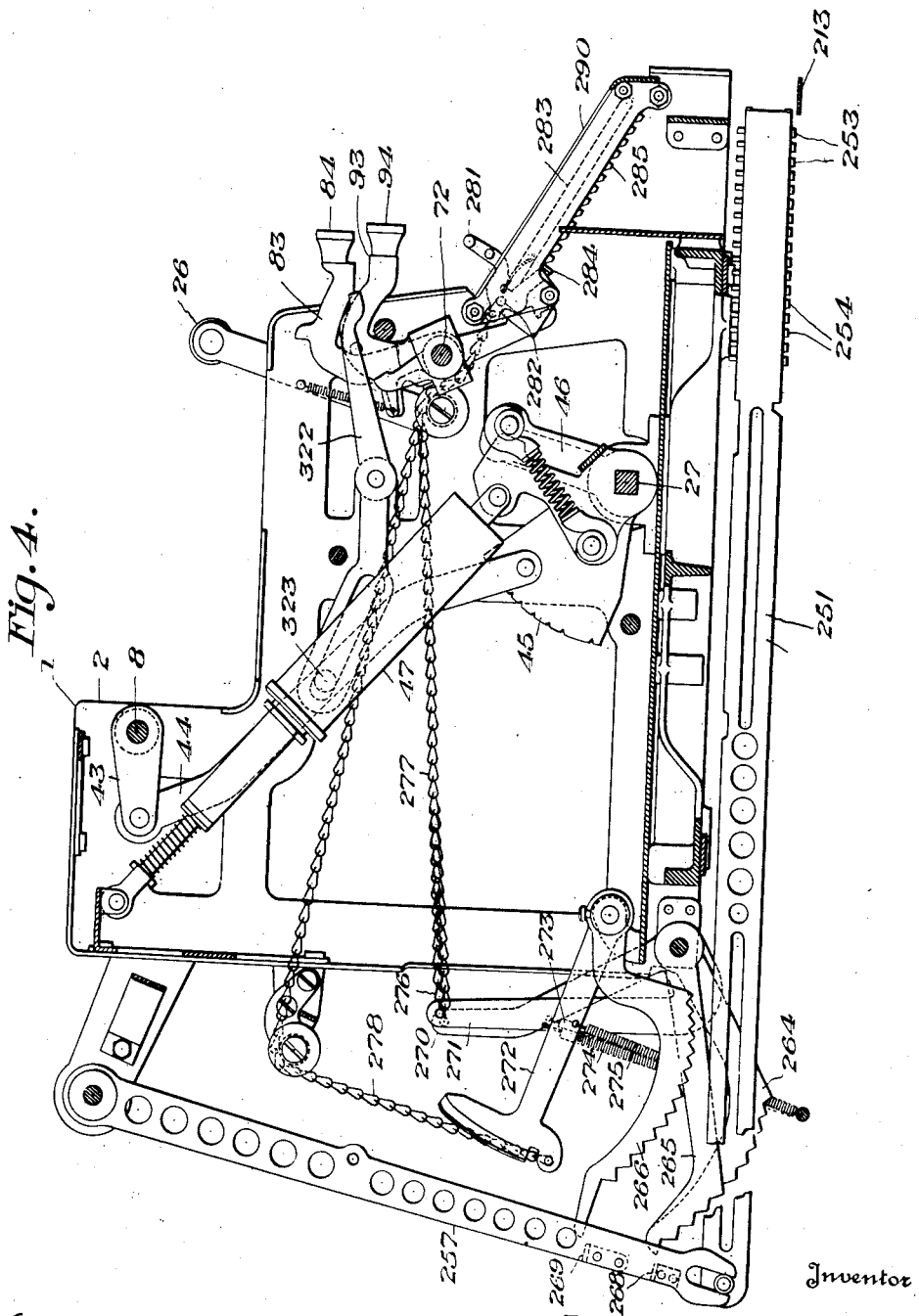
Figure 4 is another similar view taken on an irregular line 4—4 of Figure 1, and looking toward the right side of the machine.

To operatively position the type 139 there is provided mechanism for selectively moving the type carriers 123 forwardly independently of control by the actuators 7. To this end, the horizontal links 135 are provided with cam slots 140 receiving the pivot pins 137 of the type carrier levers 130 and adapted upon an upward adjustment of said links, to cam said type bar levers 130 forward an appropriate distance. The horizontal links 135 are adjusted upwardly by means of a vertically movable yoke 141 comprising a pair of arms 142 suitably pivoted at one end, as at 143, below said links 140 and connected by a cross rod 144 extending through elongated cam slots 145 in said links. The yoke arms 142 carry a horizontal rock shaft 146 (Figs. 8 and 9) having fast upon its opposite ends a pair of substantially horizontal coupling levers 147, 148, each provided with a notch 149. The coupling levers 147 and 148 are normally held in an inactive position, against the urge of a suitably disposed contractile spring 150 by the beforementioned pull rod 102. As shown in Figures 3 and 8, one end of the pull rod 102 normally bears against a crank pin 151 on one of the coupling levers 147. In the normal position of the yoke 141, the cross rod 144 bears against the lower edges of the cam slots 145 in the links 135 in which position it is held, by the reaction of the spring 150, to urge the link 135 toward normal position. The lower edges of the cam slots 145 act to maintain the yoke 141 and coupling levers 147, 148, stationary during movement of said links 135 in straight adding operations, as will be clear. Above the coupling levers 147 and 148, a pair of vertical rocker arms 152 are pivoted, as at 153, intermediate their ends, and so that their lower ends are movable back and forth over said coupling levers. The upper ends of the rocker arms 152 are provided with cam slots 154 receiving the bail cross rod 40 previously described. The cam slots 154 are formed so that upon movement of the operating crank 26 forwardly, the lower ends of the rocker arms 152 are moved forwardly a short distance by said bail rod 40. In this position they are latched by a pair of latch arms 155 pivoted at one end upon the cross shaft 8 with their opposite ends overlying the bail rod 40 and projecting over lateral lugs 156 upon the rocker arms 152. The latch arms 155 are normally held raised from the lugs 156 by the bail rod 40 against the tension of springs 157 connected to the rocker arms 152 to urge them in a return direction. At the proper time the latch arms 155 descend and position stop shoulders 158 thereon relative to the lugs 156 to block return of the rocker arms. When the subtract key lever 98 operates the pull rod 102, as previously described, the coupling levers 147, 148, are moved by the spring 150 to engage their notches 149 with suitably disposed pins 159 upon the lower ends of the rocker arms 152 (see Fig. 12) whereby the yoke 141 is coupled to said arms for movement upwardly during initial forward movement of the operating crank 26. An upward adjustment is consequently imparted to the horizontal links 135, the type carriers 123 moved forwardly and independently and the type 139 adjusted into the starting position of the type 124. This coupled condition of the yoke 141 and rocker arms 152 will be maintained as long as the subtract key lever 98 is held in operative position and the type 139 will be operated through the same cycle of movement as type 123. In the Dalton machine, the subtract key is usually latched in operative position until the return of the operating crank 26. Upon release of the subtract key, the cross rod 144, under the urge of the spring 150, cams the link 135 back into normal position and moves the type carriers 123 independently and reversely to their former positions. When the crank 26 is returned, the latch arms 155 are raised from latching position and the rocker arms 152 are returned by joint action of the bail rod 40 and the springs 157, as will be seen. It will, of course, be understood that the operative initial positioning of the type 139 takes place during the idle forward movement of the driving arms 9, and immediately moves all the "nines" to printing position. Thereafter type 139 will be moved to the printing point corresponding in complemental value to the number of increments of movement of the driving arms 9 and actuators 11. Since the value is complemental, it will be that of the actual number subtracted. This is illustrated in Figure 11 wherein "8" is being subtracted in the calculating mechanism by adding its complement "1". It will be seen that there are provided in my invention two fields of type operated from a common starting position to and from recording position under control of the actuators and selective as units to place either field in starting position.

A series of vertically moving type hammer levers 160, (Figs. 2 and 14–20) one for each type carrier 123, are pivoted intermediate their ends, parallel with said type carrier, and above the same upon a cross rod 161 extending between the front ends of the hanger plates 129. The front ends of the type hammer levers 160 project over the printing point of the platen 120 through a guiding comb plate 162 extending between the sides of the casing 1, and are provided with type hammers 163 which descend upon the type bars 124 and 138 to impress their type against the work. The type hammers 163 descend under the action of individual springs 164 having their ends suitably connected to their levers 160 and to the comb plate 162, respectively. The hammers 163 are held in elevated position by individual type hammer latches 165 extending parallel with the hammer levers 160, above the same. Said hammer latches are slotted at 166 near their forward ends to receive a cross rod 167, extending between the hanger plates 129, so that they have both a pivotal and a limited endwise movement on said bar. In their normal position, the forward ends of the hammer latches 165 overlie the rear ends of associated hammer levers 160 (see Figs. 8, 15 and 20) with their rear ends projecting under the operating shaft 27. From this position they are movable endwise to a releasing position (Fig. 16) against the tension of individual springs 168. The hammer latches 165 are moved to releasing position by a cross bar 169 extending between a pair of crank arms 170 fast upon the operating shaft 27, and whereby the bar 169 is rotated into engagement with lugs 171 on said hammer latches to pick up said latches as the operating crank 26 nears the end of its forward stroke. The released hammers 163 then descend as will be apparent. The hammers 163 are normally retained in elevated position and are released selectively under the control of their associated type carriers 123 as follows. In the rear of their pivot points, the hammer latches 165 are provided with rollers 172 which ride upon the top edges of the type carriers 123. In the starting position of the latter the rollers 172 seat in depressions 173 in said edges of the type carriers 123 and the lugs 171 of said hammer latches are outside the path of movement of the cross bar 169. (See Figs. 15 and 18.) The depressions 173 correspond in length to the distance the zero type 125 moves from starting to recording position. Upon forward movement of the type carriers 123 past this point, the rollers 172 ride up onto the edges of the type carriers 123 moving the lugs 171 into the path of movement of the cross bar 169, before the "ones" types 125 reach recording position. At a suitable point the type carriers 123 are provided with a second similar depression 174 in which the rollers 172 seat when the zero type 139 have been moved to recording position in complemental addition. Thus the type carriers 123 lock out the hammers 163 when all said carriers are moved to either of their zero recording positions and no recording takes place during an idle clearing stroke of the operating crank 25 even though the subtract key is depressed. The type carriers 123, it will be seen, control individually the release of their associated type hammers 123 when moved to value recording positions. Each type carrier 123, above that of tens denominational order also controls, with the exception of the units carrier hammer 163, release of all hammers of lower order type carriers as follows. The hammer latches 165 are each provided with a lateral projecting lug 175 overlying the hammer latch of the next higher order type carrier 123. When the latter is moved to a value recording position, its hammer latch 165 picks up the hammer latch below it, this operation being repeated by successive hammer latches down to the hammer latch of the units type carrier, and they are all moved into position to be released by operation of the crank 26. It follows that in both straight and complemental addition, zeros will be recorded to the right of values "1" to "9".

The hammers 163 are returned by a hammer resetting bail 176, including a pair of laterally spaced horizontal levers 177 connected at one end by a bail rod 178. The bail levers 177 are pivoted intermediate their ends, upon the cross rod 167, with the bail rod 178 extending beneath the forward ends of the hammer levers 160, the rear ends of the bail levers extending rearwardly beneath the operating shaft 27. The rear ends of the bail levers 177 are formed with two concave cam portions 179 and 180, respectively, one below the other and connected by oblique cam portions 181. The cam portions 179 and 180 are curved so that in the resetting position of the bail 179 they are concentric with the operating shaft 27. The forward ends of the bail levers 177 are urged downwardly by suitable disposed contractile springs 182, but are held elevated by pivoted bail latches 183 urged by springs 184 to hook over suitably disposed pins 185 on the rear arms of said bail levers 177. The bail latches 183 are provided with tail pieces 186, disposed beneath the operating shaft 26 and formed, respectively, with a shoulder 187 and a concave cam portion 188.

The bail latches 183 are disengaged from the pins 185, the bail 126 permitted to lower under the urge of the springs 182, and the hammer latches 165 are moved to releasing position, in the order named, as the operating crank 26 nears the end of its forward stroke. At the appropriate point in this cycle of movement, the crank arms 170 engage rollers 189 thereon with the shoulders 187 of the bail latches 183 and disengage them from the pins 185. In the mean time, said rollers 189 ride upon the curved cams 179 of the bail levers 177 to maintain the bail stationary and the hammers 163 elevated. When the bail latches 183 are fully disengaged, said rollers 189 engage the oblique cam portions 181 and the springs 182 are permitted to lower the bail rod 178 until said rollers 189 engage the lower cam portions 180. During their engagement with the oblique cam portions 181, the rollers 189 ride upon the curved cam portions 188 of the bail latches 183, said portions being so shaped that said bail latches are held stationary in disengaged position. When the bail rod 178 has been completely lowered, the cross rod 169 moves the hammer latches 165 to release the hammers 163. Upon return of the operating crank 26, the rollers 189, while still engaging the oblique cam portions 181, first operate the bail 176 to return the hammers 164, and then release the bail latches 183 to be returned by their springs 184. After the hammers 163 are fully returned, the hammer latches 165 are released by the cross bar 169 and are returned by their springs 168 to latching position. By having the type hammers and hammer latches released during the forward movement of the crank 27 and operating mechanism, the springs 28 which return said crank and mechanism to accumulate values in the register, are relieved of this extra load during the accumulating operation. Incidentally, since there is less load opposing forward movement of the operating crank, as will be apparent, the slight extra load thus imposed imparts balance to the operating crank and operating mechanism.

Rotatably mounted upon the comb plate 162 upon opposite sides of the series of type carriers 123, (Figs. 1, 3, 14 and 32-36) and above the latter, are a pair of ribbon spools 190, each of which has fast thereon a driven ratchet wheel 191.

Associated with the ratchet wheels 191 is a horizontally reciprocating ribbon feed bar 192 mounted by means of elongated slots 193 upon studs 194 projecting forwardly from the comb plate 162. The feed bar 192 is provided with a pair of driving pawls 195 for engaging the tops of the ratchet wheels 191. The teeth of the ratchet wheels 191 and their associated driving pawls 195 are arranged to effect rotation of the ratchet wheels in relatively opposite directions by movement of the feeding bar 192. The feed bar 192 is reciprocated by means of a bell crank 196 pivoted upon the comb plate 162 and slotted at one end, as at 197 (Fig. 35). The bell crank 197 is rocked by operating lever 198 (see Figure 3), pivoted intermediate its ends upon one of the hanger plates 129. A roller 199 on one end of the operating lever engages the slot 197 of the bell crank 196. The opposite end of the operating lever 198 extends beneath the operating shaft 27 and is slotted at 200 to receive a roller 201 carried by a crank arm 202 mounted upon the operating shaft 27, whereby operation of said shaft rocks the feed lever in opposite directions to impart similar movements to the bell crank 196. The arrangement of the operating lever 198, slot 200 and crank 202 is such that the ribbon is fed immediately after the type hammers 163 have been returned and the type withdrawn from engagement with the ribbon. The form of ribbon feed mechanism and operating devices imposes a minimum of extra load on the shaft 27, as will be apparent. The other end of the bell crank 196 is connected to the feed bar 192 by a ribbon reversing link 203 provided with two notches 204 and 205, respectively, (Fig. 34) either of which is designed to be engaged with a stud 206 on said bar. A spring 207 retains said link 203 in position relative to the stud 206. The driving pawls 195, stud 206 and link 203, are so co-related to each other and also to the ratchet wheels 191 that by engaging different notches 204, 205 with the stud 206 either ribbon spool 190 may be driven and the run of the ribbon thereby reversed. Individual holding dogs 208 pivoted upon the comb plate 162, as at 209, are held in engagement with the ratchet wheels 190 by springs 210. The feed bar 192 is provided with cams 211 cooperating with pins 212 upon the holding dogs 208 to disengage the holding dog of one ratchet wheel 190 while the other is being driven. The slots 193 are adapted to permit a vertical adjustment of the feed bar 192 on the studs 194 to disengage either driving pawl 195 from its ratchet wheel 191 so that the spools 190 may be manually rotated to tension the ribbon 213. The ribbon 213 is trained beneath the type carriers 123 through suitable ribbon guides 214 mounted upon the front ends of the hanger plates 129 and so that substantially half the width of the ribbon is in use. Associated with the spool mounting as indicated at 215 (Fig. 1) are removable keepers which permit the spools 190 to be removed and interchanged to bring the other half of the ribbon 213 into use.

Mounted upon the base 116, below the type carriers 123 and ribbon 213 is a work carrier mechanism designated generally 216, see Figures 21 and 22 particularly. This mechanism 216 includes a series of three horizontally disposed rectangular frames 217, 218, and 219 mounted in superposed relation to surround the platen 120 and position the uppermost frame 219 slightly above the top thereof. The lower frame 217 is stationary, being affixed to the frame bars 117, in right angular relation thereto and has its outside front and rear edges beveled to provide tracks 220 extending in the direction of letter or column spacing. The second frame 218 is mounted upon the tracks 220 at a right angle to the frame 217, by rollers 221 whereby it is movable thereon in column spacing direction. This frame 218 has its inside side edges beveled to provide tracks 218' extending in a line spacing direction. The third or uppermost frame 219 is mounted upon the tracks 221 by grooved rollers 222 whereby it is movable on or relative to the frame 218 in a line space direction and with said frame in column spacing direction. A sheet of comparatively thin, light, preferably flexible material is stretched taut across the frame 219 and suitably fastened thereto, for instance as illustrated in Figure 27, to provide a diaphragm forming a sheet or work collating support or carrier 223 backed by or depressible against the platen 120. A gauge bar 224 is secured along one marginal edge of the frame 219 for aligning the marginal edges of work sheets collated on the carrier 223. Cooperating with the carrier 223 are a series of work clamping fingers 225 (Figs. 21, 23, 27 and 28) mounted upon a rock shaft 226 journaled on the gauge bar 224 to descend in unison upon the adjacent edge of the sheets under the action of suitably disposed springs 227. The rock shaft is provided with a hand lever 228 for releasing said fingers and a spring-urged latch 229 for holding the handle 228 in releasing position. The sheet carrier 223 is normally held in and automatically retracted to a first column, first line position, as follows. A suitably disposed stop 230 (Fig. 21) limits retractile movement of the frame 218, and a stop 231 (Fig. 22) limits retractile movement of the frame 219. A retracting drum 232 mounted at the rear of the base 116, is urged by a motor spring 233 (see also Fig. 26) to retract both frames 218 and 219 by means of a cable 234 having its ends connected to the drum and frame 219, and passed around pulleys 235 (Fig. 22) on the frame 218. Included in the work carrier mechanism is line locating mechanism comprising a line gauge plate 236 on the frame 219 and cooperating with an overlying line stop 237 (see also Fig. 24) on the frame 218. The line gauge plate 236 is provided with two parallel rows of finger holes or recesses 238 (Fig. 21) spaced apart in each row at intervals corresponding to double line spacing but staggered so that the holes in both rows alternate at single line space intervals. The finger holes 238 may be numbered alternately in sequence, as indicated at 239. To effect line spacing, the operator has merely to place his finger in a selected finger hole 238 and move the frame 219 and carrier 223 in line spacing direction until arrested by contact of the finger with the line stop 237. At this point, a spring operated holding dog 240 pivoted upon the frame 218, engages a toothed rack 241 on the frame 219 and holds the latter from being returned. Column spacing is manually effected by moving the frame 218 together with the frame 219 and carrier 223 on the frame 217. There is also provided column locating means including a series of finger holes 242 provided at column space intervals in the frame 217 into which the operator may insert his finger to act as a stop for the frame 218, as will be clear. The frame 218 carries a suitably positioned, resilient bumper 243 for engaging the operator's finger. When a selected column position has been reached, a spring-operated holding dog 244 pivoted on the frame 218 engages a toothed rack 245 on the frame 217 and holds the frame 218, 219 and carrier 223 against return. A release lever 246 is pivoted at a suitable point upon the frame 218 and is operatively connected as by links 247 and 248 to the holding dogs 240 and 244 respectively, to release them simultaneously whereupon the frames 218 and 219 and carrier 223 return to starting position under the influence of the spring drum 232, as will be apparent. It will be noted that the drum 232 constitutes a single motor operative to effect relative movement of work and printing mechanism both laterally and longitudinally of the work to a predetermined writing position.

Associated with the foregoing main recording mechanism are auxiliary recording units which will now be described.

At one side of the type carriers 123, a series of three type carriers, 249, 250 and 251 (Figs. 4, 14, 17 and 37) respectively, are mounted side by side upon the cross rods 128 (see Figure 17). These type carriers form part of a combined date and special character printing unit. They are, except as presently noted, constructed and mounted as described with reference to type carriers 123 and occupy the same starting positions as said carriers 123. Two of the type carriers, 249 and 250, carry number type 252 arranged in numerical order beginning at the front of these carriers.

The third type carrier 251 carries the usual special character type 253, for designating total, non-add, sub-total, and substract operations, followed by abbreviating type 254 for designating the months and the year. The type of the carriers 249, 250 and 251 are mounted thereon as described with reference to type 125 and 139.

Figure 6:
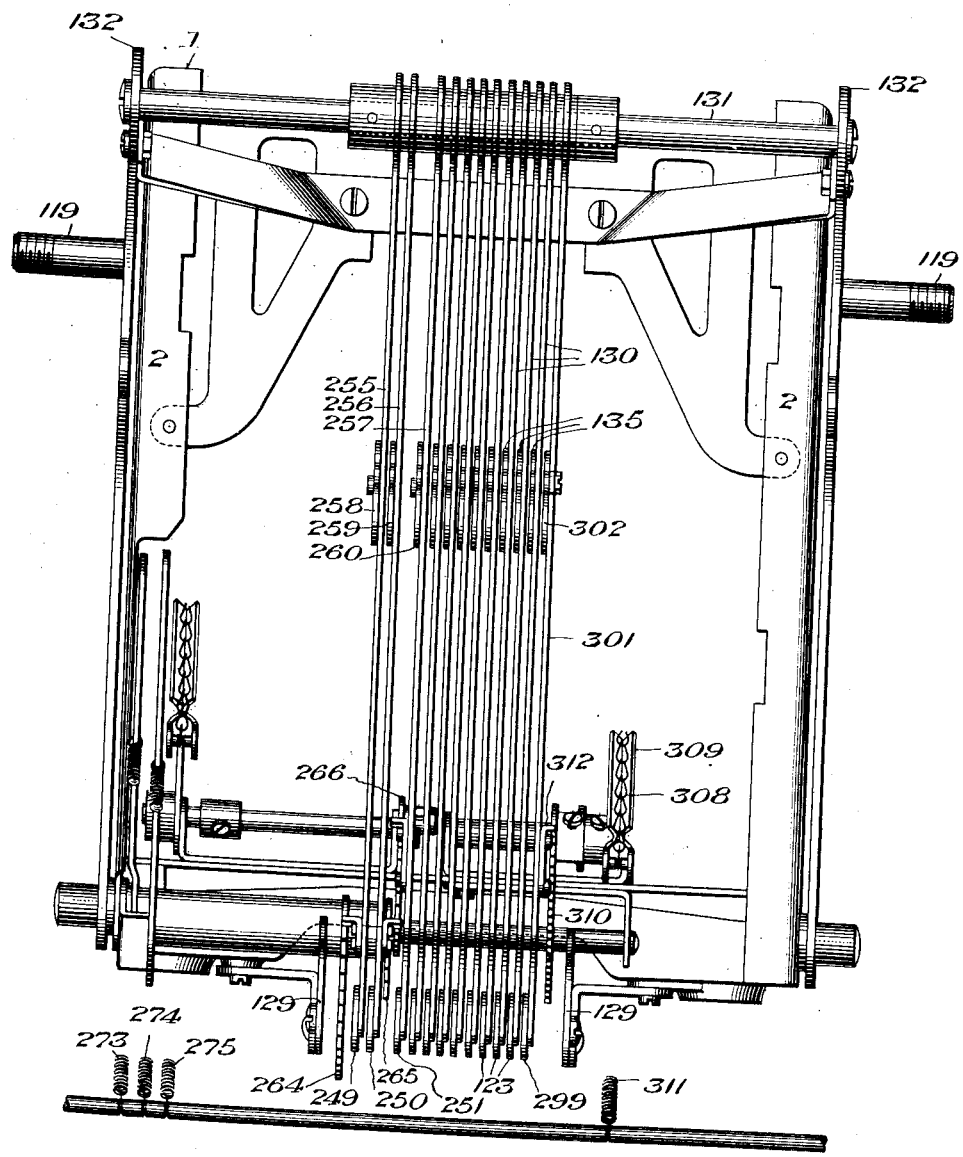
Figure 6 is a detail view in rear elevation.

Operatively connected to the type carriers 249, 250 and 251 are individual type carrier levers 255, 256 and 257 (Fig. 6), respectively, having the same characteristics described with reference to the type carrier levers 130. Individual links 258, 259 and 260, respectively, corresponding to links 135, are pivotally connected at one end to the type carrier levers 255, 256 and 257. The other ends of the links 258 and 259 are connected to arms 261 and 262 (Fig. 1) corresponding to driving arms 9. The other end of the link 260 is connected to the previously described arm 110 (see Fig. 37). Each of the arms 261 and 262 are operated by the bail rod 40 and springs 263, as described with reference to driving arm 9 and arm 110. For convenience in assembling, the links 258, 259 and 260 are constructed and disposed, like the links 135, to receive the cross rod 144 of yoke 141, but are connected to their type carrier levers 255, 256 and 257 so that their consequent adjustment by said yoke 141 does not affect their type carriers 249, 250 and 251. The selection of type 252 and 254 is controlled, as regards date recording, independently of the keys of the calculating mechanism. For this purpose individual stepped segments 264, 265, and 266 (Fig. 4) for each type carrier lever 255, 256 and 257 are pivotally mounted at the rear of the casing 1, for movement in the path of stop lugs 267, 268, and 269 carried by said levers. The stepped segments 264, 265 and 266, it will be understood, are adapted to be set to different positions to limit forward movement of corresponding type carriers as successive type are moved to recording position. Said stepped segments have operatively connected thereto individual setting levers 270, 271 and 272, respectively, by means of which they are set to different positions against the action of suitably disposed springs 273, 274 and 275, respectively. The setting levers 270, 271 and 272 are connected by pull chains 276, 277 and 278 to setting keys 279, 280 and 281 (Fig. 1) located at one end of the key board of the calculating mechanism. Said setting keys are mounted by pivot pins, one of which is shown at 282 (see Figure 4), which are slidable in guideways, as at 283, and whereby they may be rocked on said pins and set to different positions. Each setting key 279, 280 and 281 is provided with an integral holding dog 284 projecting beneath a rack 285. Suitably disposed springs, as at 286, (Fig. 37) normally urge said setting keys about their pivot pins 282 to engage the holding dogs 284 with the teeth of their racks 285 to normally prevent return of said setting keys from their set position. By rocking said setting keys against their springs 286, they may be released for return movement, as will be clear. The proper position of the setting keys 279, 280 and 281 are indicated by scales 287, 288 and 289 (Fig. 1) marked off on a slotted cover plate 290, through which said setting keys project, in correspondence with the type 252 and 254. After the type 252 and 254 have been moved to recording position, they are operated by hammers 293, 294 and 295, respectively, mounted and operated as described with reference to hammers 163.

As regards special character printing, selection of the type 253, as will be clear, is normally under the control of the special control keys 71, 84, 94 and 99 of the calculating mechanism. It will, of course, be understood that these types are arranged on their type carriers 251 so that they are moved to recording position in correspondence with the character of the special control key depressed, and that no type 253 moves to the printing point unless a special control key is depressed to move the segmental stop lever 82 (Figs. 10 and 37) from its normal position. Since in its normal and different set positions the segmental stop lever 82 obstructs forward movement of the type carrier 251 and the month abbreviation type 254 follow the special character type, it follows that operation of the special character and date printing unit for date printing purposes is blocked under normal operating conditions.

To render the special character and date printing unit operative for date printing purposes, there is provided means for shifting the segmental stop lever 82 out of normal obstructing position relative to the stop 114. This means is controlled by the setting key 281 and includes a lever 296, one end of which engages a pin 297 on the sliding link 80. The other end of the lever 296 (see Figures 37 and 41) is, in the starting position of the setting key, engaged by a cam 298 on said key, whereby said sliding link 80 and segmental stop lever 82 are held in normal position against the tension of the spring 81. When the setting key 281 is slid from its starting position the lever 296 is released, whereupon the spring 81 moves the sliding link 80 to set the segmental stop lever 82 into an unobstructing position, as shown in Figure 37. The type carrier 251 may then be moved by its spring 111 until stopped by its stepped segment 272.

Figure 2:
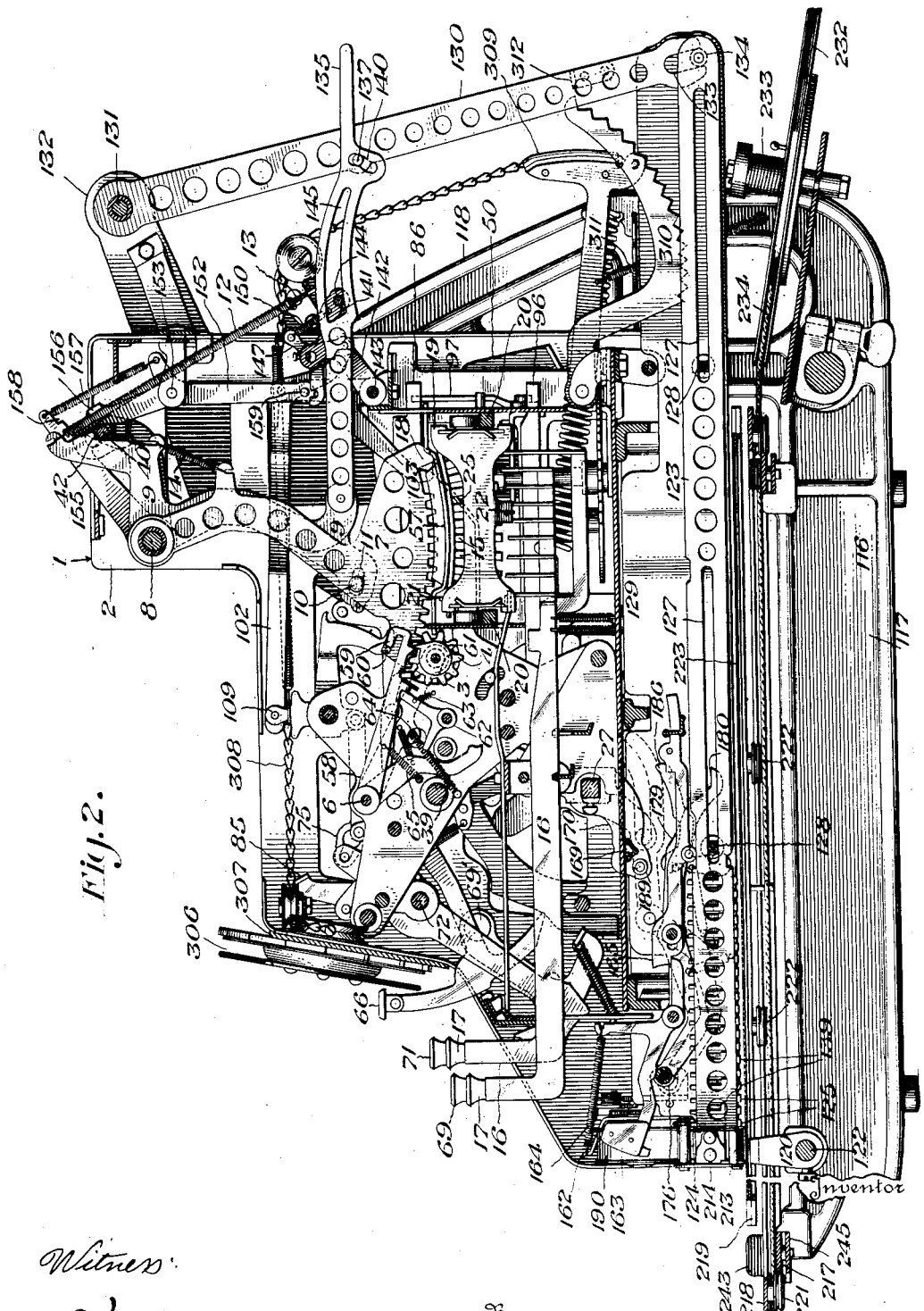
Figure 2 is a longitudinal sectional view, on a smaller scale, taken on the line 2—2 of Figure 1 and looking toward the left side of the machine.

An identification recording unit is also associated with the main recording mechanism as follows. Mounted at the side of the type carriers 123 opposite the type carriers of the combined special character and date recording unit is a type carrier 299 (Figs. 1, 6 and 17) similar to those previously described but carrying a series of abbreviating type 300 for identifying items, for instance as balance, net or credit items. The type carrier 299 is mounted and operated to move the type 300 to and from recording position precisely as described with reference to the other type carriers through the medium of a type carrier lever 301 (Fig. 3), link 302, arm 303 and spring 304. A hammer 305 (Fig. 1) corresponding in character and position to the hammers 163, cooperates with the type 300. Selection of the type, in this instance, is controlled, independently of the keys of the calculating mechanism, by a dial wheel 306 (Figs. 1 and 38 to 40) suitably mounted upon a plate 307 secured to the front of the casing 1. The dial wheel 306 is adapted to wind up a pull chain 308 (Fig. 2). The chain 308 is connected to a setting lever 309 of another pivoted stepped segment 310 held in a normal position by a spring 311 and cooperating with a stop lug 312 on said type carrier lever. The dial wheel 306 has finger holes 313, designated in correspondence with the type 300, and by means of which it is rotated, up to a stop 314 intercepting the finger of the operator. The dial wheel 306 and stepped segment 310 are held in set position during the downstroke of the operating crank 26, which is to say, during the recording operation, and are then automatically returned as follows. A pivoted holding dog 315 engages a ratchet wheel 316 on the dial wheel (see Figures 38 to 40). The holding dog 315 has pivoted thereon a floating trip dog 317. A suitably connected spring 318 urges said trip dog about its pivot in one direction and the holding dog 315 into engagement with the ratchet wheel 316. The holding dog 315 during its normal play between teeth of the ratchet wheel 316, bears at one end against a locking dog 319 which is urged by a spring 320 in the direction of said holding dog. The locking dog 319 has a shoulder at 321, positioned to engage said end of the holding dog and lock said dog in disengaged position when it is moved rearwardly beyond its normal play. The holding dog 315 is moved to disengaging position by a pivoted rocking lever 322 operatively connected at 323 to the link 44 (see Figures 4 and 9) to move in unison with the operating crank 26, and normally bearing against the trip dog 317 to prevent pivotal movement thereof. When the operating crank 26 is moved downwardly, corresponding movement of the rocking lever 322 releases the trip dog 317 which thereupon snaps over said lever. During the return stroke of said crank and lever, the latter picks up the trip dog 317 and thus moves the holding dog 315 to disengaging position. At the proper time the locking dog 319 is operated by its spring 320 into locking position. A pin 235 on the trip dog 317 traverses a cam slot 324 formed in the plate 307 and as the rocking lever 322 turns the holding dog clockwise (Fig. 38), the inclined wall of the cam slot 324 by control of the pin 325 therewith causes the trip dog to turn counter-clockwise to displace said trip dog from over the rocking lever 322 before the latter begins its down stroke, and retains said dog in this position until the locking dog 319 is released. As soon as the holding dog 315 moves to disengaging position, the spring 311 returns the stepped segment 310 and dial wheel 306 to starting position. As the latter nears starting position, a pin 326 thereon engages and moves the locking dog 319 to a releasing position. The holding dog 315 and trip dog 317 are then returned by the spring 318. The ratchet wheel 316 is provided with a stop tooth 327 adapted to contact a stop 328 to limit the return of the dial wheel 313 against the action of the spring 311.

The pin 326 may, as will be obvious, be used to manually release the holding dog, and thus correct a wrong selection before it is recorded.

The foregoing constitutes a detailed description of a preferred embodiment of my invention, but I reserve the right to effect such modifications or variations thereof as may come fairly within the scope of the appended claims.

What I claim is:

1. In combination, key set calculating mechanism including operating mechanism, and recording mechanism including fields of number type adjustable as units jointly by said key set and operating mechanisms to substitute one field for another.

2. In a machine of the character described, calculating mechanism including operating mechanism, recording mechanism including horizontal type carriers below the calculating mechanism and movable to and from recording position and also independently of such positioning movement for type selection, sets of type on each type carrier adapted to be selected by said independent movement of the type carriers, mechanism for moving the type carriers and including adjustable type carrier levers, means for causing the operating mechanism to adjust said levers, and latch mechanism for maintaining the type carrier levers in adjusted position.

3. In a calculating machine, the combination with a single field of settable value selecting stops, and keys for setting the stops, of recording mechanism operative under control of set stops of said field to record either in actual or complemental correspondence with the values selected therein.

4. In a adding machine, the combination with a single field of settable value selecting stops, and keys for setting said stops to select the values to be added, of recording mechanism operative under control of set stops in said field to record either in actual or complemental correspondence with the values selected therein.

5. In a calculating machine, the combination with a single field of settable value selecting stops, and keys for setting said stops, of recording mechanism including, number type, type carriers movable horizontally to position the type at the printing point, and means for moving the type carriers under control of set stops in the field to position type at the printing point corresponding to either the actual or the complemental value of the selection in said field.

6. In a calculating machine, the combination with a single field of value selecting stops, and keys for setting said stops, of a flat barlike platen, two fields of differently characterized type movable in a horizontal plane over the platen, and means for moving type in either field over said platen under control of set stops in said field.

7. In a calculating machine, the combination with differential actuators and operating mechanism, of recording mechanism including type carriers movable past the printing point, two sets of type on each type carrier, and means for moving said carriers by operation of said operating mechanism to locate type of either set at the printing point under control of said actuators and including, type carriers levers, operating connections between said levers and actuators, and means for varying the relation between said connections and levers by operation of said operating mechanism.

8. In a calculating machine, the combination with differential actuators and operating mechanism, of recording mechanism including type carriers movable past the printing point, two sets of type on each type carrier, and means for moving said carriers to locate type of either set at the printing point under control of said actuators, and including, type carrier levers, adjustable operating connections between said levers and actuators, and an adjusting yoke operated by the operating mechanism to adjust said connections.

9. In combination, calculating mechanism of the ten key type including laterally movable denominational selecting mechanism automatically determining in which denominations the keys shall become effective, and recording mechanism including two fields of differently characterized type, and means for selectively causing type from said fields to record under control of the keys and denomination selecting mechanism either the actual or the complemental value of the keys.

10. In a machine of the class described, the combination with a base, and a work carrier mounted upon the base, of a machine unit including calculating and recording mechanisms, respectively, the latter embodying type bars horizontally movable below said unit under control of the calculating mechanism, and means for mounting the machine unit on said base in suspended position relative to said carrier for free movement of the type bars over said carrier and for bodily removal from its suspended position.

11. In a machine of the class described, the combination with a base, and a work carrier mounted upon the base, of a machine unit including calculating and recording mechanisms, respectively, the latter embodying type bars horizontally movable below said unit under control of the calculating mechanism, and cooperating devices on the base and unit, respectively, for removably mounting said unit in suspended position relative to said carrier and for vertical swinging movement thereover whereby said type bars are freely movable over the carrier and the machine unit may be tilted on its mounting for access to the type bars.

12. In a machine of the character described, calculating mechanism including operating mechanism, recording mechanism including type carriers movable to and from recording position under control of the calculating mechanism and also independently of such positioning movement, sets of type on each type carrier adapted to be selected by said independent movement of said carriers, mechanism for moving the type carriers and including adjustable type carrier levers, means for causing the operating mechanism to adjust said levers, and latch mechanism for maintaining said levers in adjusted position.

13. In a calculating machine, the combination with differential actuators and operating mechanism, of recording mechanism including type carriers movable past the printing point, sets of type on each type carrier, and means for moving the type carriers to locate type of either set at the printing point under control of said actuators, and including means for varying the relation between the type carriers and actuators by operation of said operating mechanism.

14. In a calculating machine, the combination with differential actuators and operating mechanism, of recording mechanism including horizontal type carriers endwise movable under control of the actuators and also independently thereof, sets of type on each type carrier interchangeable by such independent movement of the latter for the location of type of either set at the printing point under control of said actuators, and camming mechanism for imparting such independent movement to said carriers, and operative by said operating mechanism.

15. In a calculating machine, the combination with differential actuators and operating mechanism, of recording mechanism including type carriers endwise movable under control of the actuators and also independently thereof, sets of type on each carrier interchangeable by such independent movement of the latter for the location of type of either set at the printing point under control of said actuators, camming mechanism for imparting such independent movement to said type carriers, and means for coupling the camming mechanism to the operating mechanism at will.

16. In a calculating machine, the combination with a single field of settable value selecting stops, keys for setting said stops, and operating mechanism, of recording mechanism including two sets of type for recording the actual and complemental values of said stops, respectively, and means for locating type of either set at the printing point under control of a single set up of said stops, and including mechanism for interchanging said sets of type by operation of said operating mechanism.

17. In a calculating machine, the combination with actuators and operating mechanism, or recording mechanism including type carriers having sets of type thereon, means for moving the carriers under control of the actuators to locate type at the printing point, means for moving the type carriers independently of the actuators for selection of said sets, a control key, and means for coupling the last named means to the operating mechanism under control of said key.

18. In a calculating machine, the combination with actuators and operating mechanism, of recording mechanism including type carriers, sets of type on said carriers, and means for moving said carriers to selectively locate type of either set at the printing point under control of said actuators and including, adjustable operating connections between the actuators and type carriers, an adjusting member operative by the operating mechanism, and means for coupling said member to the adjustable operating connections at will.

19. In a calculating machine, the combination with actuators and operating mechanism, of recording mechanism including type carriers, sets of type on each carrier, and means for moving said carriers to selectively locate type of either set at the printing point under control of the actuators and including, type carrier levers, adjustable links connecting the levers and actuators, a yoke operative to adjust all said links, and means for connecting the yoke to the operating mechanism for operation thereby.

20. In a calculating machine, the combination with actuators and operating mechanism, of recording mechanism including type carriers, sets of type on each carrier, and means for moving said carriers to selectively locate type of either set at the printing point under control of the actuators, and including type carrier levers, adjustable links connecting said actuators and levers and having a camming connection with the latter, a yoke operative to adjust all said levers, means for coupling the yoke to the operating mechanism, and a key for controlling the coupling means.

21. In a calculating machine, the combination with actuators and operating mechanism, of recording mechanism including type carriers, sets of type on each carrier, and means for moving said carriers to selectively locate type of either set at the printing point under control of said actuators, and including type carrier levers, adjustable links connecting said actuators and levers, a single member for simultaneously adjusting all said levers, a rocker member operated by the operating mechanism, and means for coupling said members.

22. In a calculating machine, the combination with actuators and operating mechanism, of recording mechanism including type carriers having, respectively, sets of type thereon, means for moving said carriers by said operating mechanism to locate type of either set at the printing point under control of the actuators, and including means for adjusting said bars independently of the actuators to interchange said sets of type, and means for operating said adjusting means by initial operation of the operating mechanism.

23. In recording mechanism, the combination with a single field of settable stops, of type carrier bars movable over the printing point, two sets of type on each type carrier bar, and means for moving the type carrier bars to position type of either set at the printing point under control of set stops of said field.

24. In recording mechanism, the combination with a single field of settable stops, of type carrier bars movable over the printing point, means for moving said type carrier bars from a common starting position under control of said stops, a set of value type on each type carrier bar arranged to be positioned at the printing point by such movement of said type carriers, means for altering the starting position of said type carrier bars, and a set of value type on each type carrier bar arranged thereon to be positioned at the printing point under control of said stops, when the starting position of said type carrier bars is altered.

25. In recording mechanism, the combination with a single field of settable stops, of type carriers movable over the printing point, type carrier levers for moving said type carriers, mechanism for operating the type carrier levers under control of set stops of said field, differently located sets of type on each type carrier, and means for adjusting the type carrier levers to bring type of either set to the printing point under control of said set stops.

26. In recording mechanism, the combination with a single field of stops having, respectively, positions of fixed value in said field and settable from an ineffective to an effective position, and keys for setting the stops, of printing mechanism including a control key, and operative to print under control of the set stops of said field and said control key, either the actual values of said stops or the complements of said values.

27. In recording mechanism, the combination with a single field of stops having, respectively, positions of fixed value in said field and settable from ineffective to effective position, and keys for setting said stops, of printing mechanism adapted for printing under control of set stops in said field either the actual or the complemental values of said set stops and normally printing the actual value, and means for causing said printing mechanism to print the complemental values of the set stops, and including a control key.

28. In recording mechanism, the combination with a single field of stops having, respectively, positions of fixed value in said field and settable from ineffective to effective position, and keys for setting said stops, of printing mechanism including two sets of type adapted, respectively, for control by set stops of said field, one to print the value of said set stops and the other to print the complements of such values, and state control mechanism for predetermining which set of type shall be controlled by said set stops.

29. In recording mechanism, the combination with a single field of stops having, respectively, positions of fixed value in said field and settable from ineffective to effective position, and keys for setting said stops, of printing mechanism including a control key and operative, under control of set stops in said field and said control key, to print either the actual values of said set stops or the complemental values of such stops, and to print such actual and complemental values in different type.

30. In recording mechanism, the combination with a single field of stops having, respectively, positions of fixed value in said field and settable from ineffective to effective position, and keys for setting said stops, of printing mechanism including two different fonts of type adapted, respectively, for control by set stops of said field, one to print the value of said set stops and the other to print the complements of such values.

31. In recording mechanism, the combination with a field of stops settable from ineffective to effective position, and keys for setting said stops, of printing mechanism operative under control of set stops of said field and including two fields of type adjustable, one to displace the other, operating mechanism, and means for adjusting the fields of type and operated by said operating mechanism.

32. In recording mechanism, the combination with a field of stops settable from ineffective to effective position, and keys for setting said stops, of printing mechanism operative under control of set stops in said field and including two fields of type adjustable in a horizontal plane, one to displace the other, and means for adjusting said fields of type.

33. In recording mechanism, the combination with a single field of settable stops, of printing mechanism operative under control of said stops, and including two fields of type adjustable, one to displace the other, a control key, operating mechanism, and means for adjusting said fields of type by operation of said operating mechanism and under control of said control key.

34. In a calculating machine, the combination with actuators, and operating mechanism, of recording mechanism including type carriers, sets of type on each type carrier, and means for moving said carriers to selectively locate type of either set at the printing point under control of said actuators, and including a rocker member operated by the operating mechanism, and coupling mechanism for operatively connecting said rocker member and type carriers at will.

35. In a calculating machine, the combination with actuators, and operating mechanism, of recording mechanism including type carriers, sets of type of each type carrier, and means for moving said carriers to selectively locate type of either set at the printing point under control of said actuators, and including, a rocker member operated by said operating mechanism, a control key, and coupling mechanism rendered effective by said control key to operatively connect said rocker member and type carriers.

36. In a calculating machine, the combination with actuators, and operating mechanism, of recording mechanism including type carriers, sets of type on each type carrier, and means for moving said carriers to selectively locate type of either set at the printing point under control of said actuators, and including a rocker member moved by the operating member in opposite directions, respectively, a control key, coupling mechanism rendered effective by said key to operatively connect said rocker member and type carriers, and latching devices cooperating to latch the rocker member after movement of the latter in one direction.

37. In a calculating machine, the combination with actuators, and operating mechanism, of recording mechanism including type carriers, sets of type on each type carrier, and means for moving said carriers to selectively locate type of either set at the printing point under control of said actuators and including, a rocker member moved by the operating mechanism in opposite directions, respectively, a control key, coupling mechanism rendered effective by said key to operatively connect said rocker member and type carriers, and latching devices cooperating to latch the rocker member after movement of the latter in one direction and operated by said operating mechanism to unlatch said member prior to movement of the latter in the opposite direction.

38. In combination, calculating mechanism including operating mechanism, and recording mechanism, including fields of number type adjustable as units to substitute one field for another, a control key, and means operative by said operating mechanism under control of said key to adjust said fields.

39. In a calculating machine, including operating mechanism, the combination with a single field of settable stops, and keys for setting said stops, of recording mechanism including type carriers, sets of type on each type carrier, and means for moving said carriers to selectively locate type of either set at the printing point under control of said stops, and including a control key, and connections between said type carriers and the operating mechanism operative by the latter under control of said control key to vary the starting position of said carriers.

HARRY A. FOOTHORAP.